(12) United States Patent
Harumoto et al.

(10) Patent No.: US 6,460,097 B1
(45) Date of Patent: Oct. 1, 2002

(54) DATA STREAM OUTPUT APPARATUS

(75) Inventors: Hideaki Harumoto; Mitsuaki Morita; Susumu Kobayashi, all of Osaka-fu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/328,507

(22) Filed: Jun. 9, 1999

(51) Int. Cl.[7] .............................................. G06R 13/14
(52) U.S. Cl. ...................... 710/60; 375/240; 370/454; 370/474; 348/240
(58) Field of Search .................... 710/60; 375/240; 370/474, 454; 348/240

(56) References Cited

U.S. PATENT DOCUMENTS

| | | | | |
|---|---|---|---|---|
| 4,785,349 A | * | 11/1988 | Keith et al. ................... | 358/136 |
| 5,717,641 A | * | 2/1998 | Ando et al. ................... | 365/191 |
| 5,802,051 A | * | 9/1998 | Petersen et al. ............ | 370/395 |
| 5,854,856 A | * | 12/1998 | Moura et al. ................ | 382/232 |
| 6,043,897 A | * | 3/2000 | Morikawa et al. ......... | 358/1.14 |
| 6,101,220 A | * | 8/2000 | Ando ......................... | 375/240 |
| 6,205,156 B1 | * | 3/2001 | WataAndonabe et al. ... | 370/474 |
| 6,223,261 B1 | * | 4/2001 | Ogawa ........................ | 711/150 |

FOREIGN PATENT DOCUMENTS

JP        9-46691        2/1997

* cited by examiner

*Primary Examiner*—Jeffrey Gaffin
*Assistant Examiner*—Abdelmoniem Elamin
(74) *Attorney, Agent, or Firm*—McDermott, Will & Emery

(57) ABSTRACT

In a data stream output apparatus, it is so arranged that a read buffer(pre-reading buffer 103) is provided for storing the data stream read from the storage medium, and a memory is provided for storing a time table Mt indicating the position and size (Sm) of the data block to be sent out to the external device every given period (f) in the data stream, the data block including motion picture data to be decoded by the external device every given period (f). Further a send buffer 110 is provided for storing the data stream to be sent out to the external device via the digital interface. According to the arrangement of the data stream output apparatus, a controller is provided for controlling the outputting of the data stream stored by the read buffer 103 from the send buffer 110 to the external device via digital interface, so as to have a fixed size (K) when the size (Sm) of transmit data block is not equal to the fixed size (K), controls the outputting of the resultant data block from the send buffer 110 to the external device via the digital interface.

7 Claims, 19 Drawing Sheets

DATA STREAM OUTPUT APPARATUS

BACKGROUND OF THE INVENTION

1. Field of The Invention

The present invention relates to a data stream output apparatus for sending out data coded in a specific style from a storage medium to a network More specifically, this invention concerns a data stream output apparatus for sending out data at a fixed rate—data which change in size with time.

2. Description of The Prior Art

Among the data which change in size with time is MPEG program stream data or video data The MPEG video data including audio data is so designed that a group of pictures (GOP) (15 frames) of image data of three kinds—I, B and P pictures—makes up a unit of image data as illustrated in FIG. 3(b) (c). Also, as shown in FIG. 3(d), the video data of one GOP 303 is made up of a plurality of video packs Vp's. Furthermore, a required number of audio packs ap's are added to the plurality of video packs Vp's to constitute a system stream SS as shown in FIG. 3(e).

At the pack header PH of each video pack in the system stream SS is written a system clock reference (SCR). This SCR serves as time base to control the timing for data to be handed over to an A/V separating means from a receive buffer on the terminal system side, which will be described below. Furthermore, each video pack is provided with a packet header KH. At each packet header KH are written a decoding time stamp (DTS) to serve as time base to control the decoding timing and a presentation time stamp (PTS) which is used as time base to regulate the display timing Each audio pack also has a pack header PH and a packet header KH.The packet header KH has PTS written in it. Furthermore, the top pack in each GOP is provided with a system header HS on which an identifier is written indicating the pack is at the top of the GOP. In practice, the DTS and PTS are written on packet headers as necessary depending on the types of I, B and P pictures, and not on all the packet headers.

In the MPEG program stream data thus configured, GOP's are not uniform in data size. For example, the data size is small where there are not much changes with time, while the data size is large where much changes with time take place.

FIG. 18 is a conceptual diagram showing an example which adopts a push-type send method. This push-type send method sends out the MPEG program stream data unilaterally without paying regard to the conditions at the terminal. The disk unit 10a in the video server system 100 stores the MPEG program stream data thus built. The video data including audio data which is DMA transferred from the disk unit 10a to the send buffer 10b is sent out to the terminal system 1500 via the network 300. At the terminal system 1500, the video data obtained that way is temporarily stored in the receive buffer 1510 and then is referred to a decoder 1520 at a specific time interval to be decoded. The decoded data is then displayed by a display means 1530.

The above example presupposes that image data coded into MPEG program stream format has been stored in the disk unit 10a. Needless to say, image data which are not coded in MPEG program stream format and that are stored in the disk unit 10a may be encoded at the server system and sent out to the terminal.

FIG. 19 is a schematic illustration of a decoder 1520 provided in the terminal system 1500. Each GOP as unit of video data (including audio data) which is temporarily stored in the receive buffer 1510 is inputted in an audio-video (A/V) separating means 1521 from the receive buffer 1510 with the timing based on the system clock reference (SCR) of each pack There, the video pack Vp is separated from the audio pack ap and is then decoded by a video decoding means 1522 according to the aforesaid DTS and outputted to the display means 1530 by a display coordination means 1523 according to PTS. The audio data ap is converted into audio signal by an audio decoding means 1524 according to PTS.

The push-type transfer system sends out variable encoded data such as MPEG program stream data that changes with time once the server side is ready to send out data even if not solicited from the terminal. Hitherto, it has been a usual practice to send out stored data compressed irrespective of the encoding rate or the reproduction rate at the terminal. And it has often happened that too much data reached the terminal beyond the decoding rate, that is, the data consuming rate. In that system, the timing or the interval at which data is transferred from the receive buffer 1510 to the A/V separating means 1521 is based on the aforesaid system clock reference. In addition, GOP's are different from each other in data size. Yet, the sending is always effected at a fixed rate determined on the basis of the capacity of the network So, it is often the case that data overflows the receive buffer 1510 before the decoding step at the terminal.

FIG. 15 is a time chart illustrating the shortcoming of the prior art in a conceptual manner. As described earlier (see FIG. 3), one unit of MPEG data, that is, a group of pictures (GOP) is made up of 15 frames that consist of image data of three kinds—I, B and P pictures—which constitute an image unit. One GOP unit is equivalent to 0.5 second of decoding or reproduction.

Now, let it be supposed that as MPEG data shown in FIG. 15(a) indicates in FIG. 15(b), the MPEG data is sent out from a server on to a network where data can be transmitted at a fixed rate of $4b$/second. In this connection, the figures—0.5 seconds—given on the upper side of FIG. 15(a) indicate the decoding rate. Also, it should be presupposed that the terminal system 1500 shown in FIG. 16 has a receive buffer 1510 with a capacity of $8b$ and that if data transmitted and stored reaches $4b$ in size, MPEG data will be reproduced, that is, decoded by the MPEG decoder 1520. The outstanding data size or the remainder of data in the receive buffer 1510 is the total size of data inputted minus the total size of data decoded. The remainder changes with time as illustrated in FIG. 15(c) and overflows the receive buffer 1510 in six seconds, turning to an error.

To illustrate, $4b$ of data ((1), (2)) are received by the receive buffer 1510 for the first one second, when decoding starts. In the next one second, an additional $4b$ of data (up to the first $1b$ of (6)) are received, while the first $4b$ ((1) and (2)) are consumed. That leaves $4b$ of data in the receive buffer. In the next one second, $4b$ data (including the remaining $2b$ of (6)) are received, while $2b$ ((3), (4)) are consumed. That leaves $6b$ in the receive buffer. That way, the receive buffer overflows in 6 seconds.

Attempts have been made to avoid that trouble with the prior art push-type transfer system which include increased capacity of the receive buffer, provision of a function to monitor the excess or shortage of data coming in at the terminal and to issue to the server a request for change in data sending rate. But those measures did not work with a network in which packets are sent out at a very high rate and in a very short cycle as exemplified by isochronous transfer under IEEE 1394. In such a network even if the terminal requested the server to change the data sending rate, the request failed to be processed in time, resulting in overflowing Another possible solution to the problem was to change the original data, the whole MPEG program stream to an MPEG transport stream suitable for the push-type transfer all over.

As a solution to the problem an arrangement as shown in FIG. 17 is proposed in the unexamined Japanese patent application laid open under No. 9-46691. Under this arrangement, a data coded by an encoder 1401 is controlled by a write controller 1403 and first stored in an encoded data storage memory (buffer) 1042. Control information obtained from the encoder 1401 is also controlled by the write controller 1403 and is stored on a control information memory 1404. The encoded data thus written in by the write controller 1403 is to be sent out under the control of the read-out controller 1405 to the network via a dummy data adder 1406.

In the dummy data adder 1406, dummy data is added in such a quantity that the size of data to be sent out is fixed. That is, the size of data to be sent is made up of data from the encoded data storage memory 1402 and dummy data added in the size to offset the shortfall in the encoded date—the difference between the encoded data size and the fixed level. This way, the fixed data size is maintained.

In the method disclosed in the Japanese patent laid open publication No. 9-46691, though no consideration is given to control of the rate at which variable encoded data is written in the encoded data storage memory 1402, there arises no problem in processing data obtained from the encoder (real-time encoder). Generally, however, data is read out from storage media, such as hard disk and DVD, in blocks of a fixed size. If the arrangement in the conventional invention is applied to data obtained from a storage medium there is a possibility that the encoded data storage memory 1402 could be overflowed. That is because while the data output from the encoded data storage memory 1402 is synchronized with the data encoding rate, the writing in the buffer of data from the storage medium is time controlled. And the same trouble as illustrated in FIG. 15 occurs within the server.

It is also pointed out that the method of the Japanese patent laid open publication No. 9-46691 adds padding (dummy data) one after another while detecting the height of the encoding rate. The operation causes time loss. In addition, the shaped data has to be copied again on a DMA buffer for transfer to the network apparatus. This added time loss is a block to sending out data real-time.

SUMMARY OF THE INVENTION

The present invention addresses those problems. encountered with the prior art data stream (MPEG stream data for example) output apparatuses and data send methods. That is, it is an object of the present invention to provide a data stream output apparatus which can read out variable encoded data from such storage media as hard disk and DVD while maintaining continuity and permits push-type transfer to a network and that transfers data to a network system while efficiently shaping the data to a fixed size.

To achieve the object, the present invention is built on a data stream output apparatus which can read out data from a storage medium to an external device via a digital interface, the data stream including motion picture data encoded at variable bit rates.

In that data stream output apparatus, it is so arranged that a read buffer(pre-reading buffer 103) is provided for storing the data stream read from the storage medium, and a memory is provided for storing a time table Mt indicating the position and size (Sm) of the data block to be sent out to the external device every given period (f) in the data stream the data block including motion picture data to be decoded by the external device every given period (f). Further a send buffer 110 is provided for storing the data stream to be sent out to the external device via the digital interface.

According to the arrangement of the data stream output apparatus, a controller is provided for controlling the outputting of the data stream stored by the read buffer 103 from the send buffer 110 to the external device via digital interface, and the controller decides the data block to be sent out for the given period (f) of data stream stored by the read buffer 103 according to the time table Mt, transmits the decided data block from the read buffer 103 to the send buffer 110, adds padding data to the transmit data block so as to have a fixed size (K) when the size (Sm) of transmit data block is not equal to the fixed size (K) controls the outputting of the resultant data block from the send buffer 110 to the external device via the digital interface.

In this invention, the fixed size (K) is equal to the maximum permissible size (M) of the portion to be decoded every given period (f) in said data stream And the time table Mt indicates the position of said data block to be decoded in said data stream in terms of an offset value counting from the head of said data stream Further the data brocks are transmitted to a system provided with a decoder for said data stream via the digital interface.

It may be possible for the data stream output apparatus to further comprise a storage means for storing data stream inputted from outside on said storage medium an encoding means for encoding data inputted from outside into data stream at variable bit rates, and a time table generating means 406 for calculating the size of data required for decoding every given period (f) according to an encode parameter and generating said time table Mt on encoded data stream It may be possible too for the data stream output apparatus to further comprise a storage means for storing data stream inputting from outside of said storage medium, and a time table generating means 406 which, if the data block inputted from outside is encoded data stream will calculate the size of data required for decoding every given period (f) according to an encode parameter and generate said time table Mt on encoded data stream In the above description, the time table Mt is assumed to be created, but, even if there is not the time table Mt, this invention could come true according to the following arrangement. The arrangement is that, while the read buffer 103 stors the data stream read out from the storage medium the send buffer 103 stors the data stream to be sent to the digital interface.

According to the arrangement of the data stream output apparatus, a controller is provided a controller controlling the outputting of the data stream stored by the read buffer 103 from the send buffer 110 to the outside device via digital interface, and the controller calculates the position and size (Sm) of the portion to be decoded every given period (f) in the data stream decides the data block to be sent out for the given period (f) of data stream stored by the read buffer 103 on the basis of said calculated position and data size (Sm), adds padding data to the transmit data block so as to have a fixed size (K) when the size (Sm) of transmit data block is not equal to the fixed size (K) controls the outputting of the resultant data unit from the send buffer 110 to the external device via the digital interface.

PREFERRED EMBODIMENTS OF THE INVENTION

Now, there will be described the embodiments of the present invention with reference to the drawings.

Embodiment 1

Figure 1:
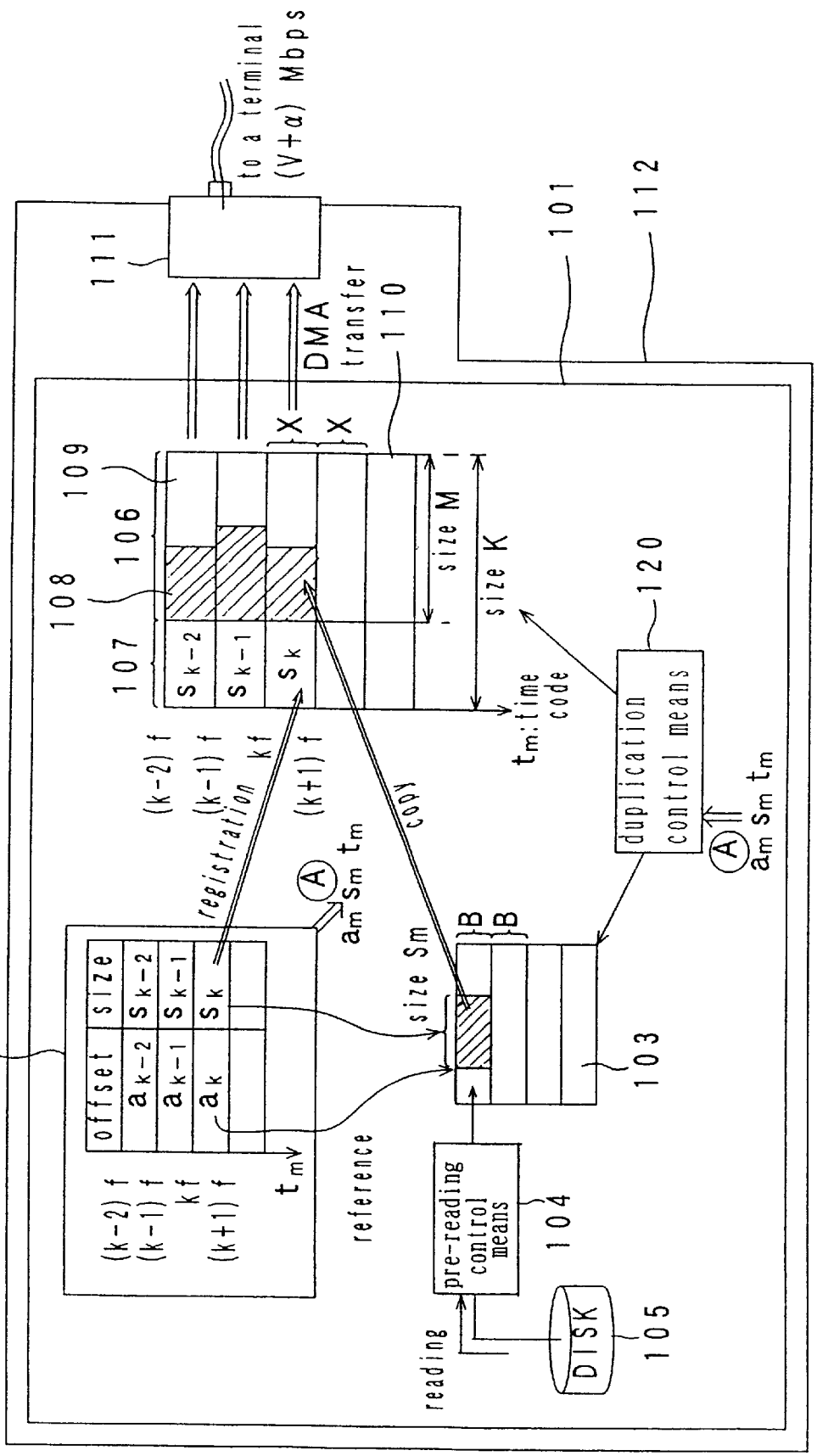
FIG. 1 is a block diagram of a server system in a first embodiment of the present invention.

FIG. 1 is a functional block diagram of an example of the server system in which the present invention is applied, that is, an embodiment of the basic arrangement or configuration of the data stream output apparatus of the present invention.

In FIG. 1, a video server system 112 includes a data stream output apparatus 101 and a bus interface 111. This system sends out data real-time—multi-media data encoded in the MPEG program stream format—in the isochronous transfer method as a request for a data is received from the terminal or the server itself instructs the terminal that a data will be sent.

The isochronous transfer technique is a system of setting up a theoretical transfer channel with a fixed rate of data transmission (data size/time) between the sender and the receiver and of transferring data in the push-type manner (that is, data are sent out as they are ready at the sender without waiting to be so instructed by the receiver). In this technique, the transmission rate is controlled by hardware every, say, 125 microseconds, and thus a very stable flow of data can be secured.

The problem is, however, that once a channel is established with the transmission rate fixed, it is technically difficult to change the rate. The terminal side might be provided with a function of making a request for a change in transmission rate so that when the receive buffer at the terminal is overflowed or is about to overflow, a request for a rate change may be sent to the server. But the server could not take action promptly.

Figure 2:
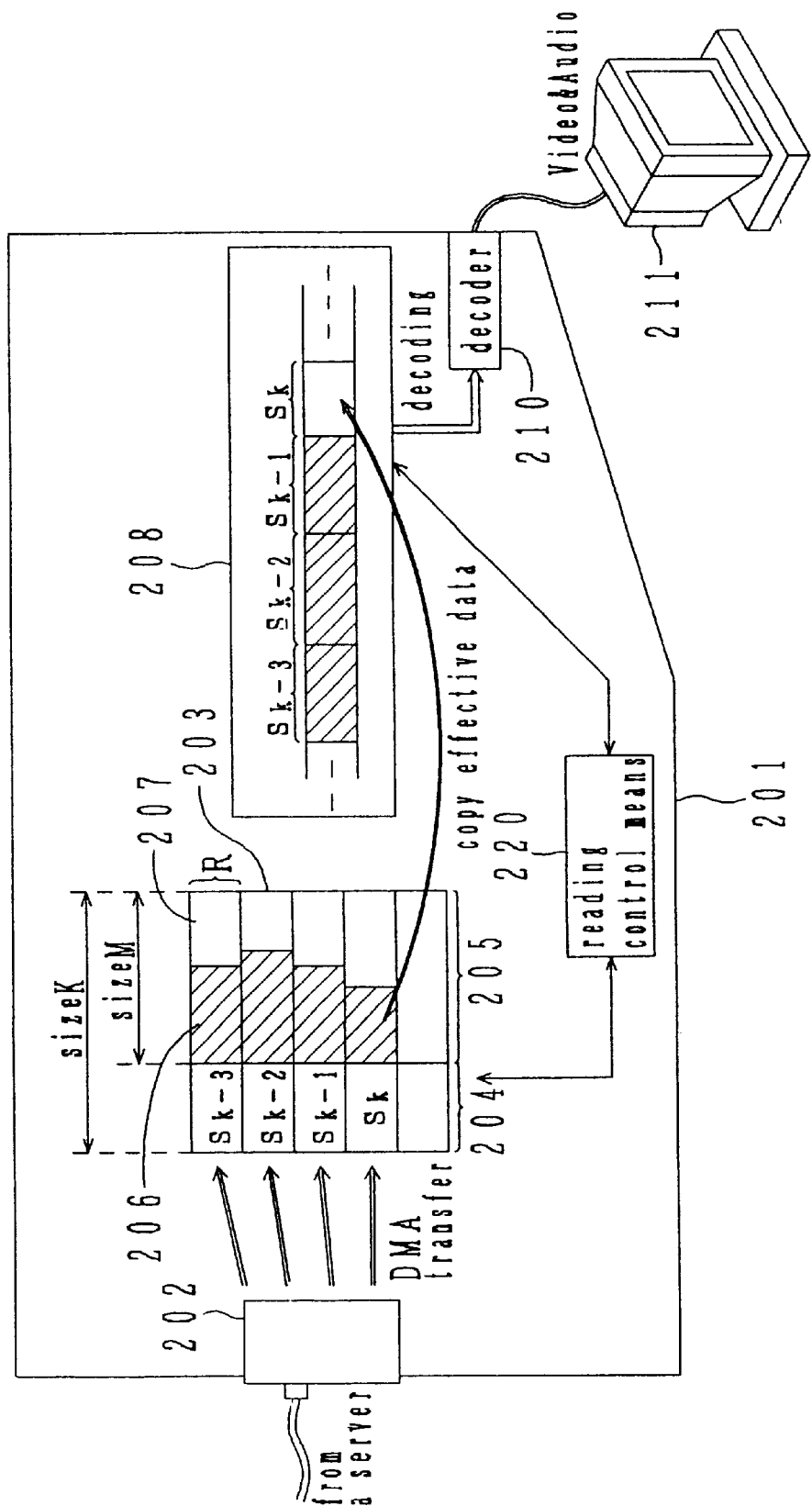
FIG. 2 is a block diagram of a terminal system to be connected to the server system in the first embodiment of the present invention

FIG. 2 shows a typical terminal system to be connected to the server system to which the present invention is applied. It is so configured that data received in an isochronous transfer technique (IEEE 1394, for example) is referred to an MPEG decoder for reproduction.

In FIG. 2, it is so designed that the isochronous packet received through an interface 202 (IEEE 1394 device, for example) via a data bus is stored on a receive section R of size K in a receive buffer 203. Then, the packets are DMA transferred to the data buffer 208 data block by data block. A plurality of receive sections R's are provided with the processing velocity taken into consideration Those receive sections R's are used one after another in a ring buffer manner so as to preclude the possibility of the flow of decoding data interrupting It also goes without saying that changes in data size K and others can be effected by the parameter of the driver soft in the interface 202.

One receive section R making up the receive buffer 203 is divided into a header segment 204 and a data segment 205. The header segment 204 has figures stored therein to indicate the size $S_m$ of effective data. On the data segment 205 are stored a plurality of video packs and audio packs including effective data (size $S_m$) 206 required for reproduction of a group of picture (GOP),(which is adopted for convenience instead of system stream SS in case of including audio data as shown in FIG. 3(e)) and padding 207 (corresponding to effective data 108 and padding 109 on the server side, which will be described below). Furthermore, the data segment 205 is provided with size M. This size M is set at a,value not lower than the size $S_m$ of expected effective data A read control means 220 reads size $S_m$ in the header segment 204 and picks out only effective data from the receive section R in the receive buffer 203 and copies on an MPEG data buffer 208.

In that process, MPEG data are stored at intervals of f which is the time required for decoding a unit of GOP. The MPEG data thus stored are referred to the MPEG decoder 210 for decoding before being displayed on a monitor 211.

The whole of those steps—isochronous transfer from the video server system 112 as shown in FIG. 1, DMA transfer from the interface 202 to the receive buffer 203, copying from the receive buffer 203 into MPEG data buffer 208 and MPEG decoding at the decoder 210—is pipe-line handled synchronized with the time f required for MPEG decoding a GOP. Therefore, there is no possibility that data will overflow or be absent somewhere, always ensuring smooth reproduction of MPEG data In this model, it goes without saying that it is assumed that the number of frames in each GOP is the same and the time f required for decoding one GOP is fixed.

Figure 13:
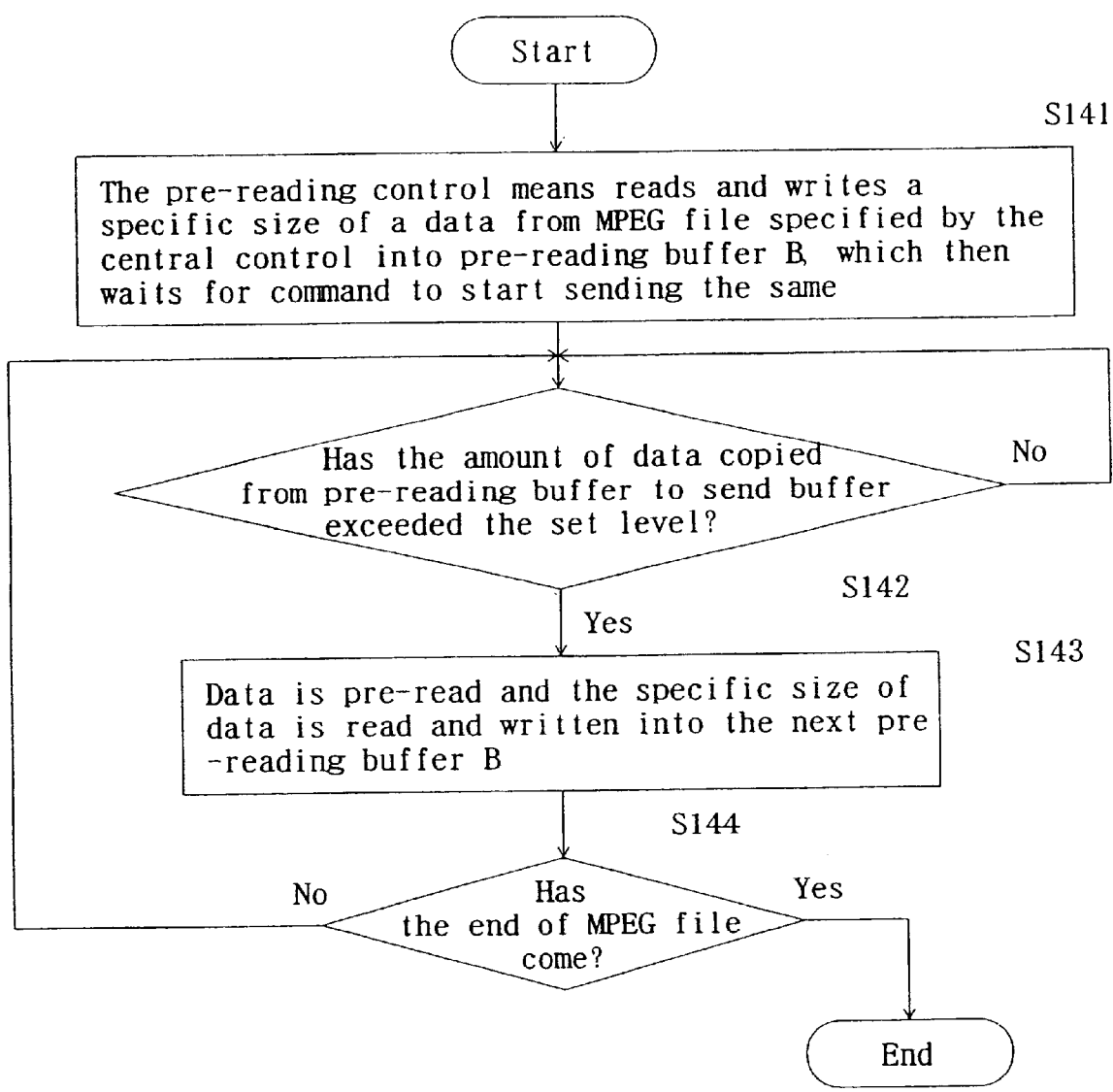
FIG. 13 is a flow diagram showing the operating procedure of a pre-reading control means.

Shown in FIG. 1 is a system on the sender side, that is, a video server system to ensure smooth MPEG reproduction at the terminal as shown in FIG. 2. The arrangement of the system will be explained along with the manner of operation of the system First, a command to open a file comes from the terminal or the application within the system Then, a specific size, say, 256 K of data from a specified file stored in the disk unit 105, is written at a pre-reading section B in the buffer 103 as illustrated in FIG. 13 (FIG. 13, Step S141), which will be explained in the following The pre-reading control means 104 constantly monitors the data consumption at the pre-reading buffer 103. If the size of data stored in the pre-reading buffer 103 falls below a specific level (if the size of duplication from the pre-reading buffer 103 into the send buffer 110 exceeds a specific level), data will be pre-read again one after another in a fixed size from the disk unit 105 at a rate sufficiently higher than the velocity which will be described later:(FIG. 13, Steps S142→S143→S144). Furthermore, the pre-reading buffer 103 is provided with a plurality of pre-reading sections B's of the aforesaid specific size arranged in a ring buffer style. Namely, it is so configured that sufficiently before data in one pre-reading section Bare consumed, a certain size of data to be read will have been supplied to the next pre-reading section B It is assumed that MPEG stream data encoded in a maximum data size M per GOP is sent out to the terminal from the send buffer 110 via a network and that the send rate is V mbps. The send buffer 110 is provided with a data segment 106 of size M to store effective data for one GOP and a header segment 107 to store the attributes of the effective data. The two segments constitute one send section X of size K In addition, the send buffer 110 is provided with a plurality of such send sections X's in order to secure continuity of data to be sent out to the network Those sections are used in the form of a ring buffer as in the pre-reading sections B's in the pre-reading buffer 103.

Since it is assumed that the number of frames in each GOP is fixed (generally at 15) and the time f required for decoding one GOP is also fixed generally 0.5 second), accordingly the order of GOP s (the number of processed GOP'S) linearly corresponds to the reproduction time required. If the number of processed GOP's increases, the reproduction time required will rise in proportion. The time search map Mt as shown in FIG. 1 is a time table prepared with that taken into consideration. On that time table are recorded the offset address $a_m$ for each GOP in MPEG data from the top of the file and the total data size $S_m$ of a specific GOP. The suffix m specifies the time code $t_m$ on the time search map Mt where $t_m$=mf. The suffix m is positive integer. It is also noted that while the term "time code" corresponds to the system clock reference SCR in the MPEG method, the term "time code" will be used herein from now on. The process of generating the time search map Mt will be explained later. By the way, the time search map Mt may be kept on an exclusive storage means provided within the video server system or may be stored on the disk unit 105 from which the map is read out on a semiconductor memory means as necessary.

First, when a command to open a file comes from the terminal or the application with the system, the duplication control means 120 in the data stream output apparatus 101 will have read in the offset address $a_m$ and the size $S_m$ all from the time search map Mt (FIG. 12, Step S131) before starting the duplication procedure described below. Now, an example is considered of sending out a GOP of data corresponding to a specific time code $t_k$–(kf) [k: a specific value of integer m]. The pre-reading control means 104 assumes that a GOP corresponding to the time code $t_k$ has been read out from the disk unit 105 in the step of sending out data before the time code $t_k$—at the time code $t_k$—1, for example, —and already been stored on a specific pre-reading section B in the pre-reading buffer 103.

Figure 12:
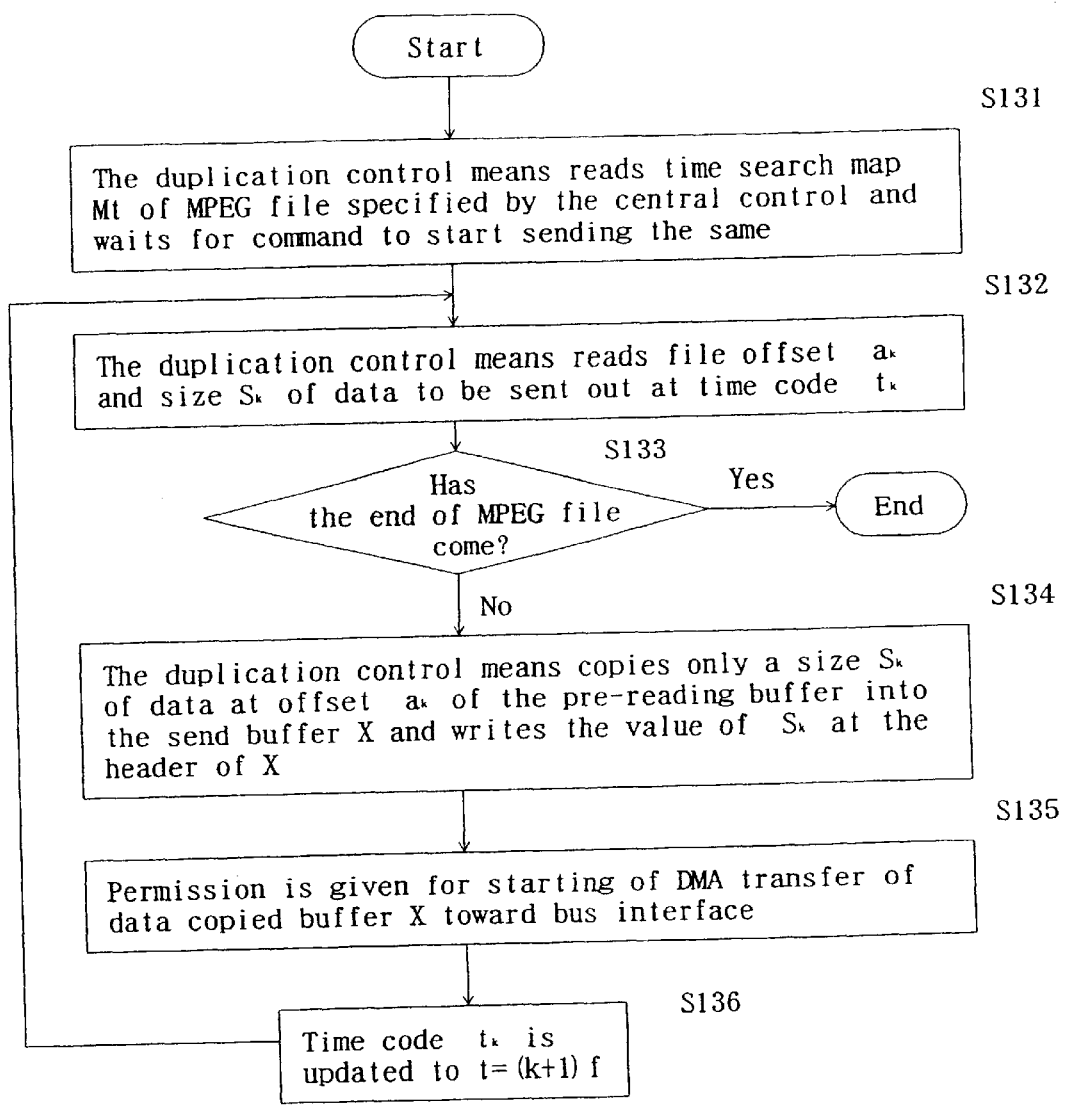
FIG. 12 is a flow diagram showing the process of the first embodiment of the present invention

Then, the duplication control means 120 takes out an offset address ak and data of size $S_k$ and copies data of size $S_k$ from the pre-reading buffer at the position corresponding to the offset address ak into the send buffer 110 (FIG. 12, Steps S132→S133→S134)

Each send section X in the send buffer 110 is divided into the header segment 107 and the data segment 106. Those two segments combined are given a memory capacity for size K of which size M is allocated to the data segment 106.

The effective data 108 occupies an area for size Sk in the data segment 106 of size (M) the area extending from the top of the data segment 106. The remaining segment M–$S_m$) is for padding 109 (for null data, for example). Furthermore, the duplication control means 120 registers the value representing the size $S_k$ for the effective data 108 at a specific position of the header segment 107. That gets a GOP of data corresponding to time code $t_k$ ready for DMA transfer to the bus interface 111 (FIG. 12, Step S135).

Similarly, data at time code $t_{k+1}$=(k+1) f and after that are put in the send buffer 110 GOP by GOP (FIG. 12, Step S136). The driver soft in the bus interface (IEEE 1394 device) 111 takes in data from the send buffer 110 and adds transfer information thereto, then sends the same to the hardware in the bus interface 111 by DMA transfer method. The DMA transfer from the send buffer 110 to the interface 111 does not have to be effected for the whole of the size K at once, but may be done in a number of small portions.

Figure 3:
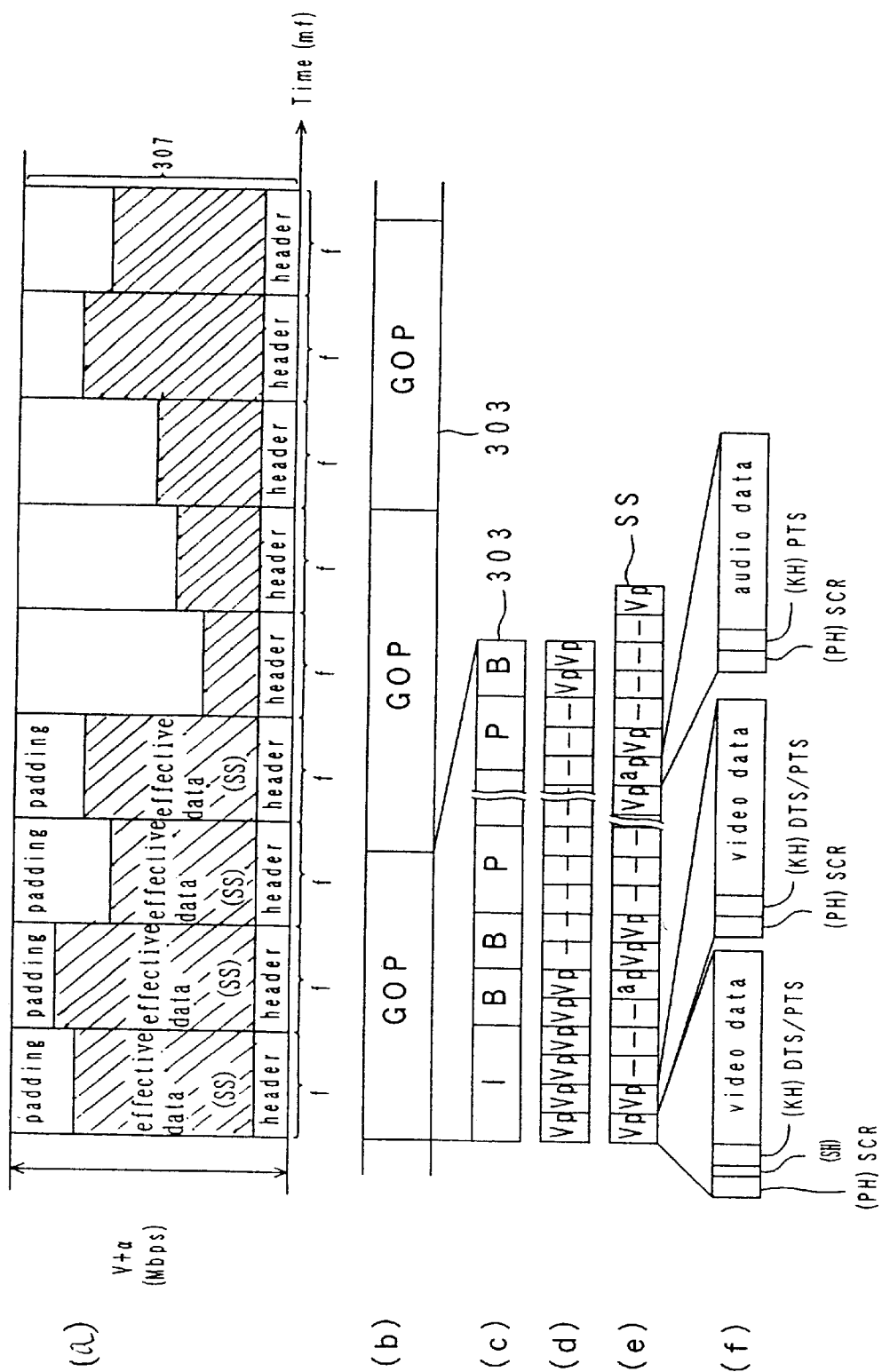
FIG. 3 is a conceptual diagram showing the flow of data to be sent out on a network bus.

The interface 111 internally edits the data thus received into a isochronous packet and sends that to the terminal in (V+α) mbps as shown in FIG. 3. Herein, α has a value corresponding to the increase size of data after addition at the time of transfer of such data as header information except for MPEG data and the padding First, the data encoded in the MPEG program stream format and stored in the disk unit as shown in FIG. 1 is formed, as in the prior art, of a collection or a plurality of video packs Vp's (FIG. 3(c)) and audio packs ap's required for reproduction of one GOP 303 (FIG. 3(d)).

When the data is sent out to the network bus along with the padding as described, the data 307 of size K stored in the header segment 107 of the send buffer 110 and the data segment 106 as shown in FIG. 1 is sent out with one GOP as unit per unit time f (to be exact, one GOP including audio data) as shown in FIG. 3(a). Although not shown in FIG. 1, data 307 is further divided into packets of a small order (of the order of 124 microseconds, for example) in practice and sent out to the network But the aforesaid point that data is divided in small packets to be sent to the network is not the subject of the present embodiment, and there will be no detailed description about that.

If the isochronous packet sent out from the send buffer 110 in the process as described reaches the terminal via the network bus (IEEE 1394 bus), the data is subjected to MPEG decoding in the process as shown in FIG. 2.

The present embodiment has shown a case where IEEE 1394 is used as network interface. Needless to way, the same data output method will work well in the push-type transmission in Ethernet or Embodiment 2

Figure 4:
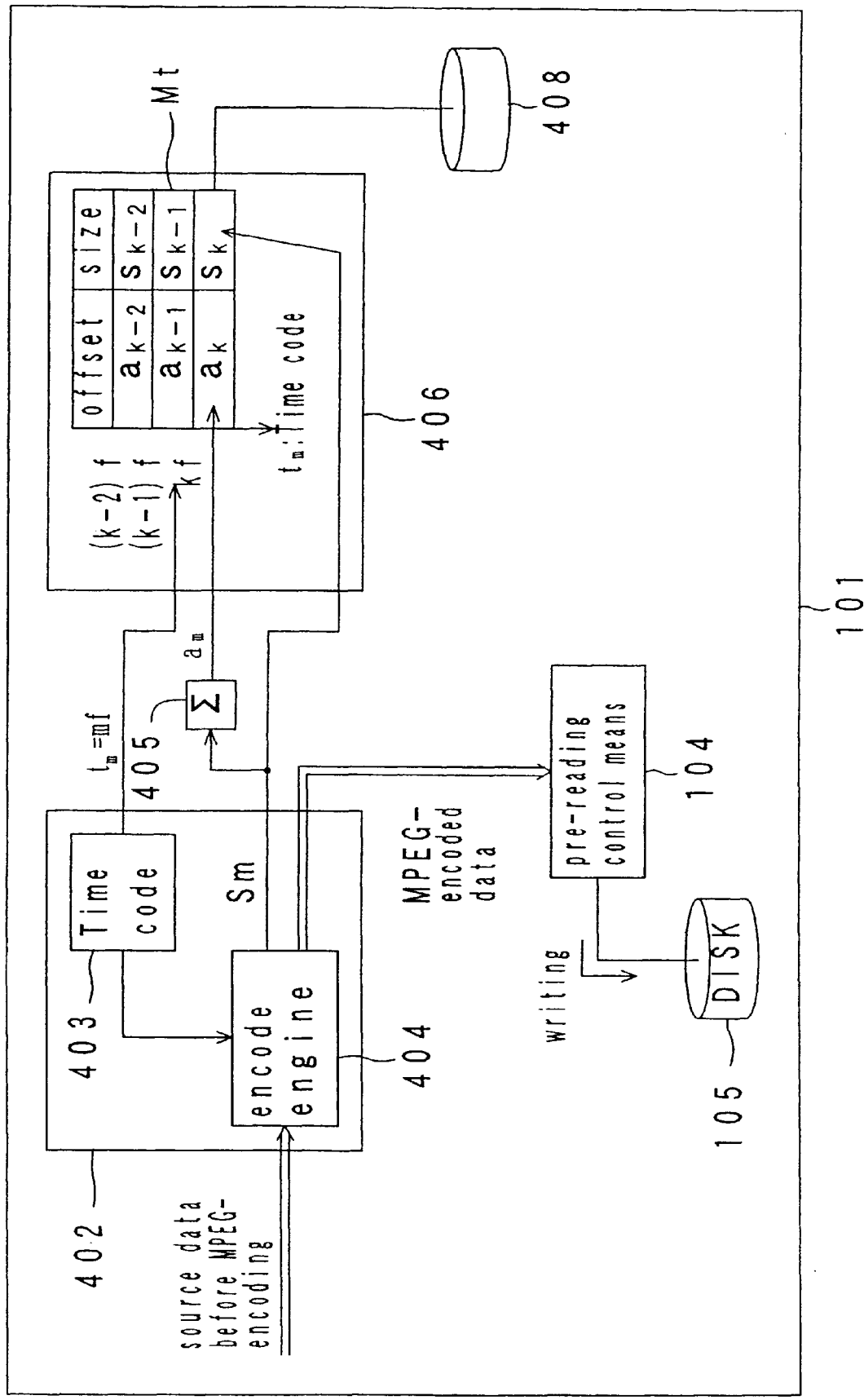
FIG. 4 is a block diagram of a server system in a second embodiment of the present invention.

FIG. 4 shows a system example in which a function to generate a time search map is incorporated in the data stream output apparatus shown in Embodiment 1.

As source data or uncoded data such as images and sounds is supplied to the data stream output apparatus 101 from outside, the source data is led to the MPEG encoder 402 and encoded by an encode engine 404 provided in the encoder 402. The MPEG encoder 402 is furthermore equipped with a system encoder 403. This system encoder 403 generates a system clock reference corresponding to the time code $t_m$. The system clock reference is then registered on a pack header in a pack for multiplexing video and audio data generated by the encode engine 404 as mentioned.

In this connection, it is understood that the'synchronization between the video data and audio date is ensured by the system encoder 403. The encoded data is to be written in the disk unit 105 through the pre-reading control means 104. Here, the pre-reading control means 104 has merely a function of managing the data stored in the disk unit 105.

Into the offset address generating means 405 is inputted real data of size $S_m$ one GOP after another after encoding by the encode engine 404. Adding up the real data size $S_m$, the offset address generating means 405 generates an offset address $a_m$ of the GOP now being processed from the top of the file.

Into the time search map generating means 406 are inputted data size $S_m$ calculated from the total number of packs in one GOP and time code $t_m$ obtained from the system encoder 403 and offset address $a_m$ obtained from the offset address generating means 405. The time search map generating means 406 then completes a time search map Mt in which the offset address am corresponding to each GOP and size $S_m$ are related to each other in the form of a time table with the time code $t_m$ of the top pack in one GOP as base axis. That time search map Mt is kept in a time search map storage region 408. This storage region 408 may be within an exclusive storage area in the system or a storage area provided in the disk unit 105 for storing encoded data Embodiment 3

Figure 5:
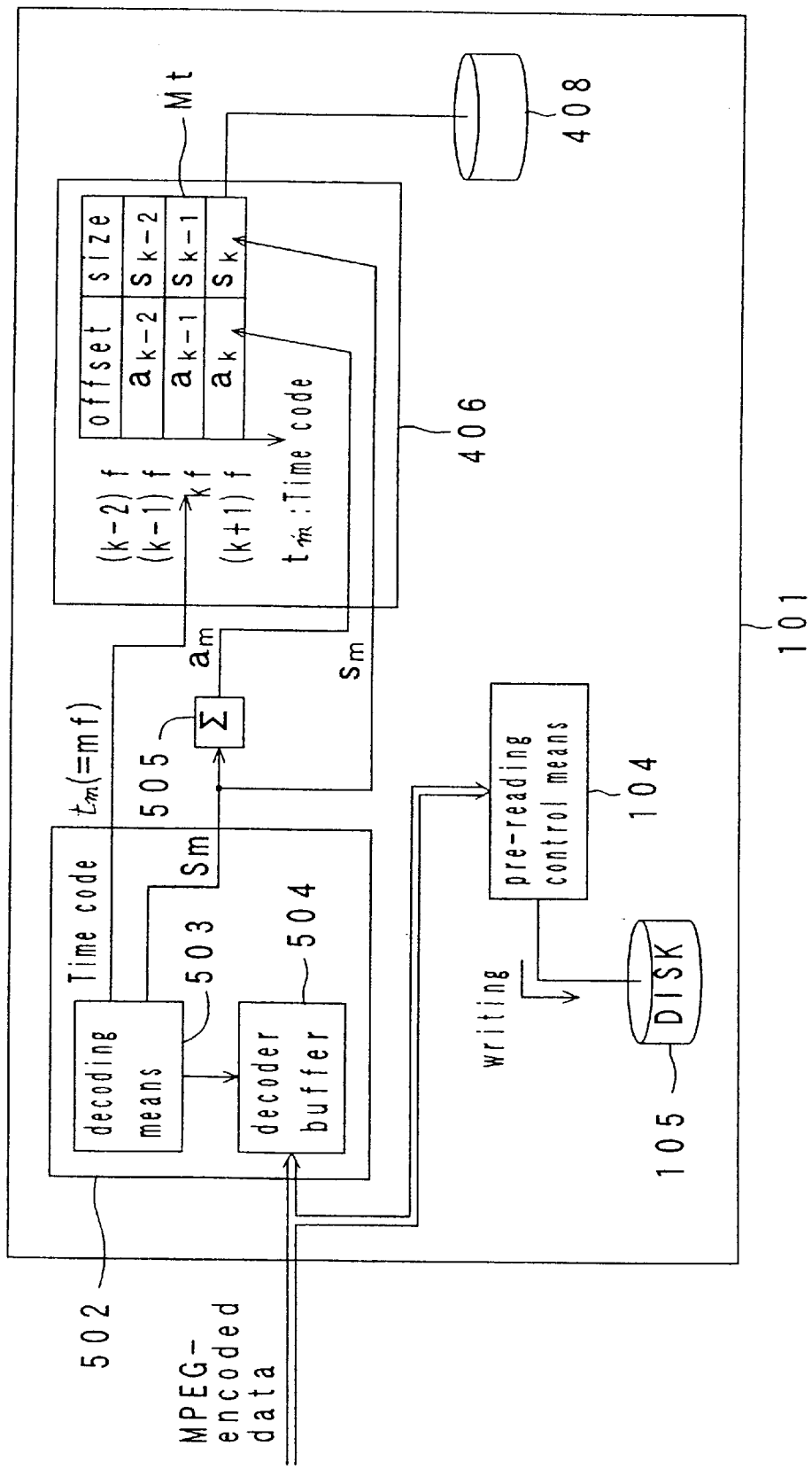
FIG. 5 is a block diagram of a server system in a third embodiment of the present invention.

The preceding embodiment shows a configuration in which source data is inputted uncoded in the data stream output apparatus. FIG. 5 shows an arrangement where data already encoded in the MPEG format are inputted in the data stream output apparatus.

As data encoded in the MPEG format are supplied to the data stream output apparatus 101 from outside, those data are written in the disk unit 105 through the pre-reading control means 104 and led to the decoder 502 for data analysis. There, the pre-reading control means 104 performs a function to manage the data written in the disk unit 105.

Unless data are read out on the decoder 502 while the data are written in the disk unit 105, there is no need to synchronize the writing in the disk unit 105 with data analysis. Therefore, the MPEG decoder 502 has a decoder buffer 504 to input data temporarily depending on the analysis rate.

If data contained in a video pack indicate that the pack is forefront pack in one GOP, the MPEG decoding means 503 in the MPEG decoder 502 begins and continues to count packs until the forefront pack in the next GOP comes up, working out the data size of one GOP. The MPEG decoding means 503 also picks out time code tm from the pack header of the forefront pack in the GOP, too. The data size $S_m$ of each GOP, which is acquired by the decoding means 503, is added up from the top of the file, therefore an offset address $a_m$ of the GOP now being processed is generated—the address or location of the GOP as seen or counted from the head of the file. In this connection, the top pack in each GOP is provided with an identifier, a system header SH or GOP header, for example, which indicates the pack is at the top of the GOP. The identifier is provided at the heat of the OP data according to the MPEG protocol (see FIG. 3(d)). The GOP header is incorporated at the head of the video data as shown in FIG. 3(f).

As described in Embodiment 2, time search map, generating means 406 generates a time search map Mt on the basis of, that is, by relating the time code $t_m$, offset address am and size $S_m$ thus obtained to each other. As in Embodiment 2, the time search map Mt is stored in the time search map storage region 408. This storage region 408 may be within an exclusive storage area in the system or a storage area provided in the disk unit 105 for storing encoded data Embodiment 4

The preceding embodiments need a time search map Mt to control data time-wise when data are transferred from the pre-reading buffer 104 to the send buffer 110. Preparation of this time search map Mt may be omitted under the following arrangement.

Figure 6:
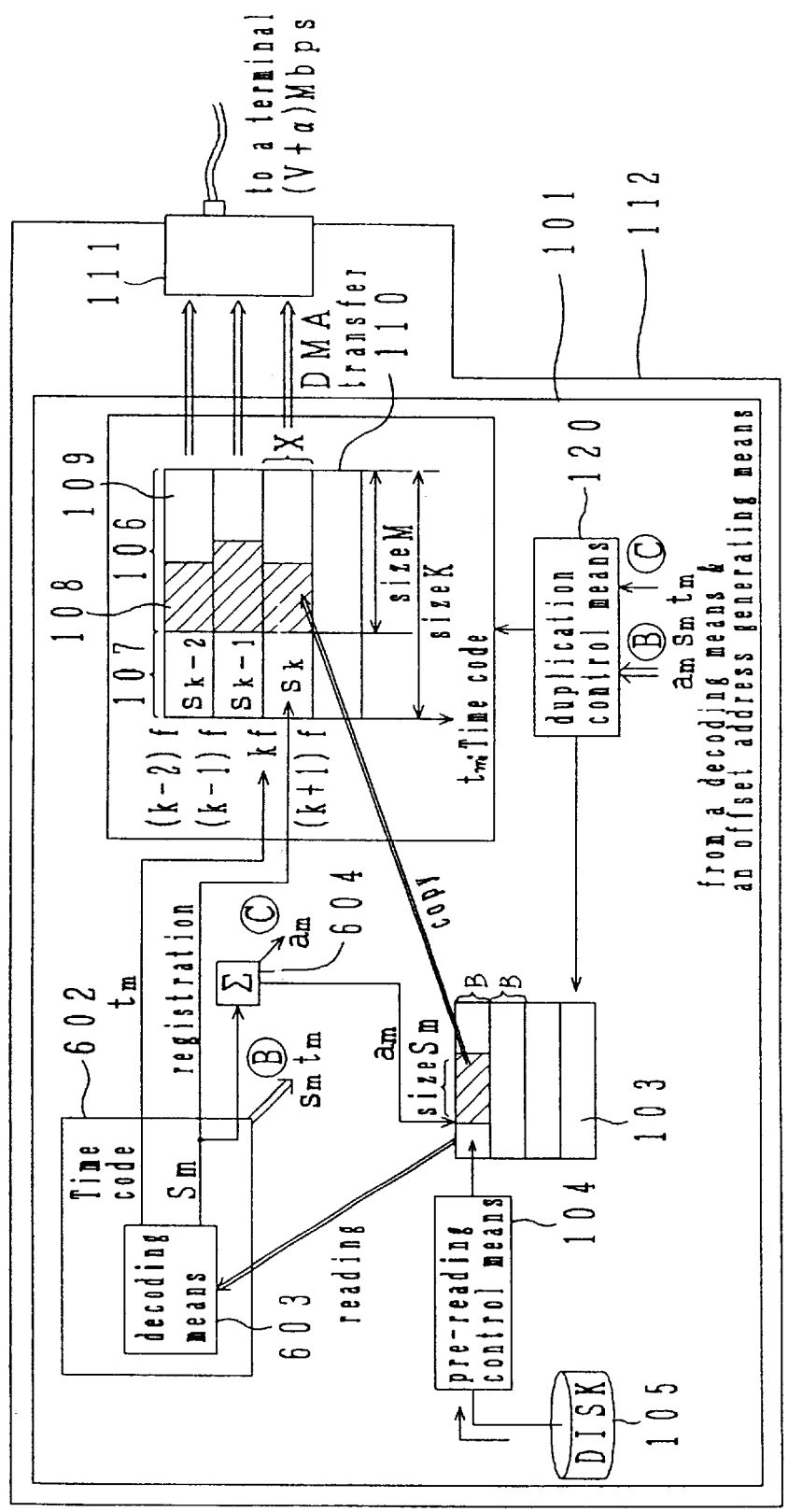
FIG. 6 is a block diagram of a server system in a fourth embodiment of the present invention

FIG. 6 shows a server system to send out data real-time by IEEE 1394 isochronous transfer technique—data stored in the disk unit 105 and encoded in the MPEG format.

The pre-reading buffer 103 and the send buffer 110 are the same as those described in Embodiment 1 and will not be explained again here in this embodiment. Also as in Embodiment 1, it should be assumed in the present embodiment that the data stream output apparatus 101 sends out encoded MPEG format stream data at a rate up to data size M per GOP (V mbps in time-wise rate).

As in Embodiment 1, specific sizes of encoded data are supplied from the pre-reading control means 104 to the read-out section B as a file is opened. Meanwhile, as specific sizes of data are written in the pre-reading buffer 103, the decoding means 603 in the decoder 602 reads in a specific size of part out of the data written in the pre-reading buffer 103 and waits for a send-starting command to come from the terminal or the application within the server system (FIG. 14, Step S151).

As a send command is received, the decoding means 603 analyzes the data read in. If data contained in a video pack indicate that the forefront pack in one GOP, the decoding means 603 starts and continues to count packs until the forefront pack in the next GOP comes, calculating the data size $S_m$ of one GOP. The decoding means 603 also picks out time code $t_m$ from the pack header of the forefront pack in the GOP, too.

Figure 14:
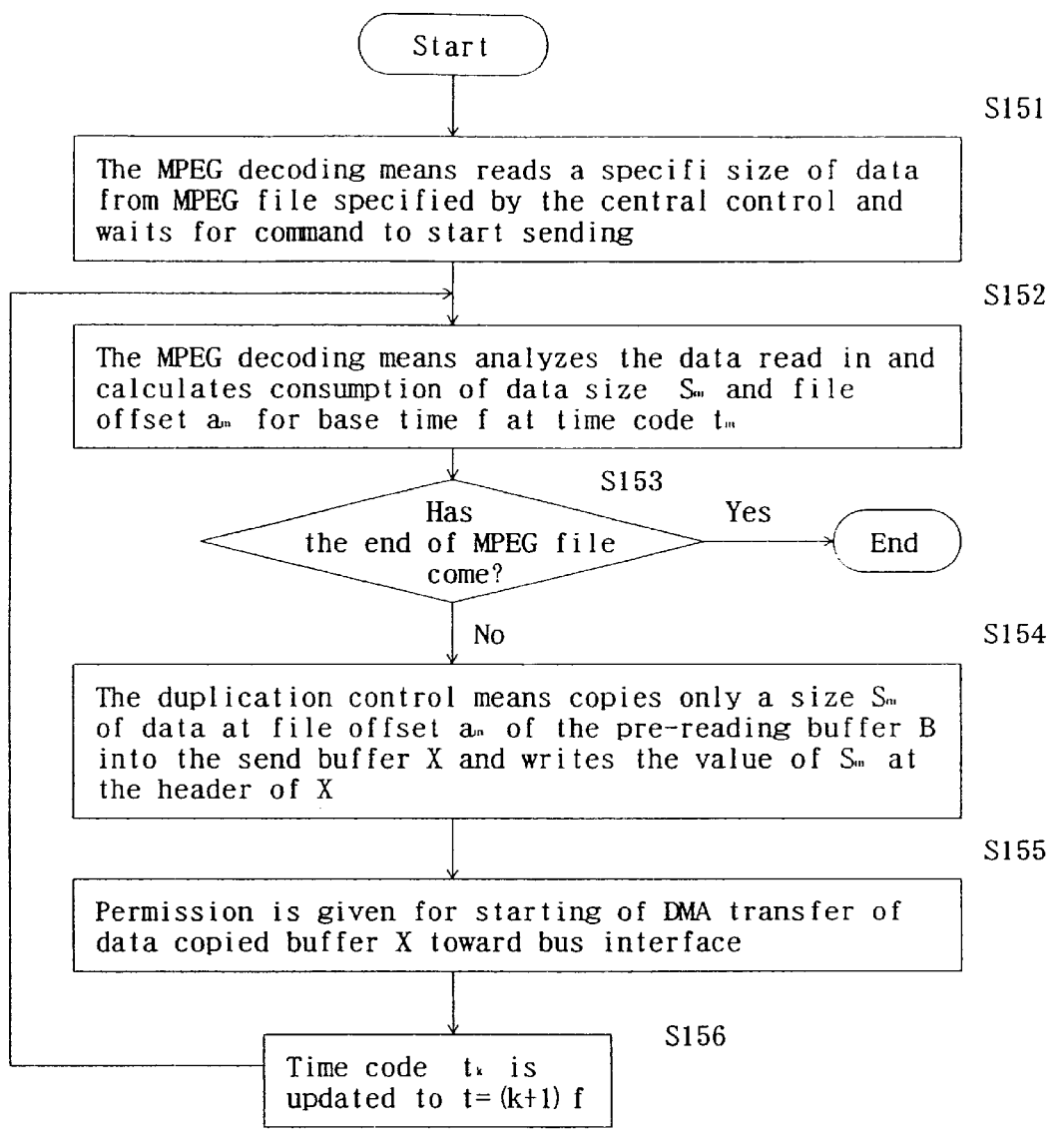
FIG. 14 is a flow diagram showing the process of the fourth embodiment of the present invention
Figures 15A, 15B, 15C:
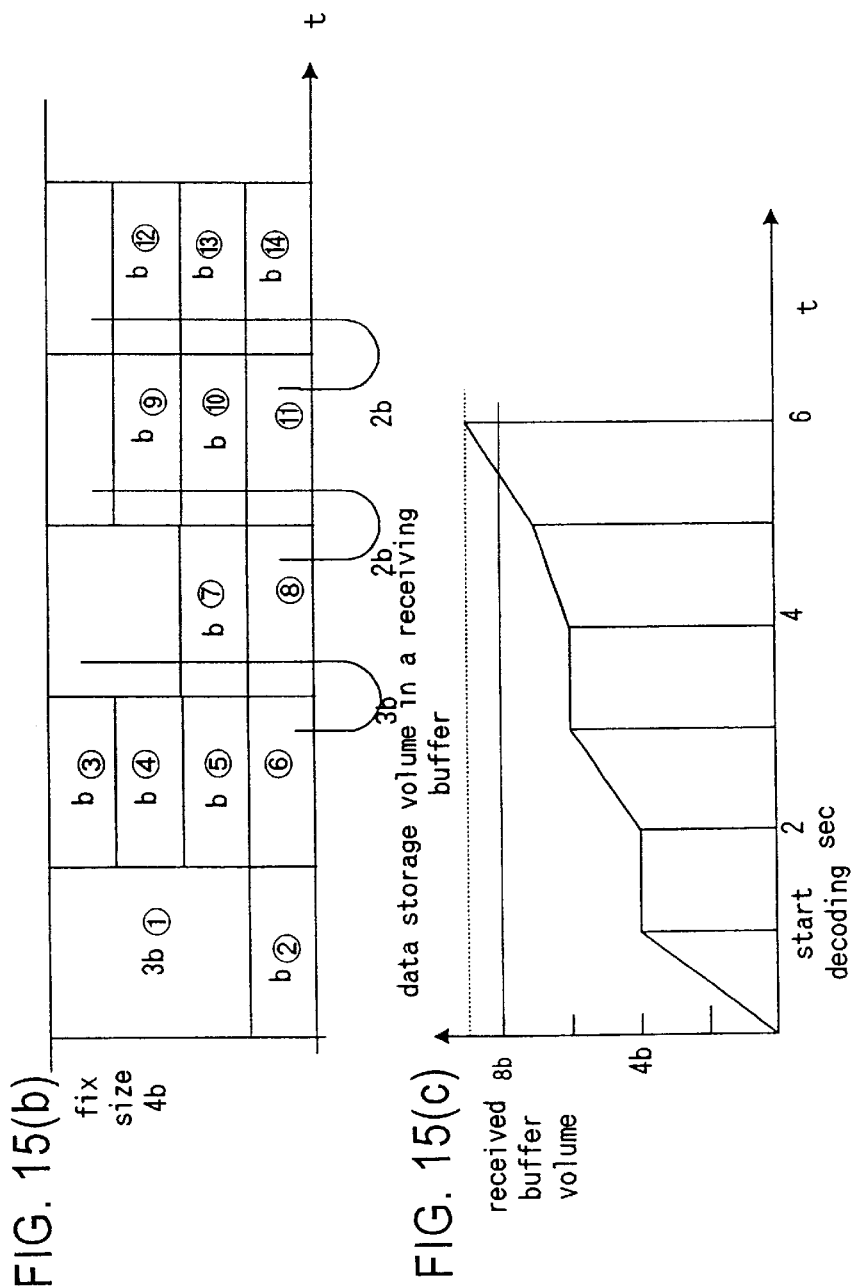
FIG. 15 is a model diagram schematically showing an error that occurs in sending out on a network variable encoded data in a fixed rate push-type method.
Figure 16:
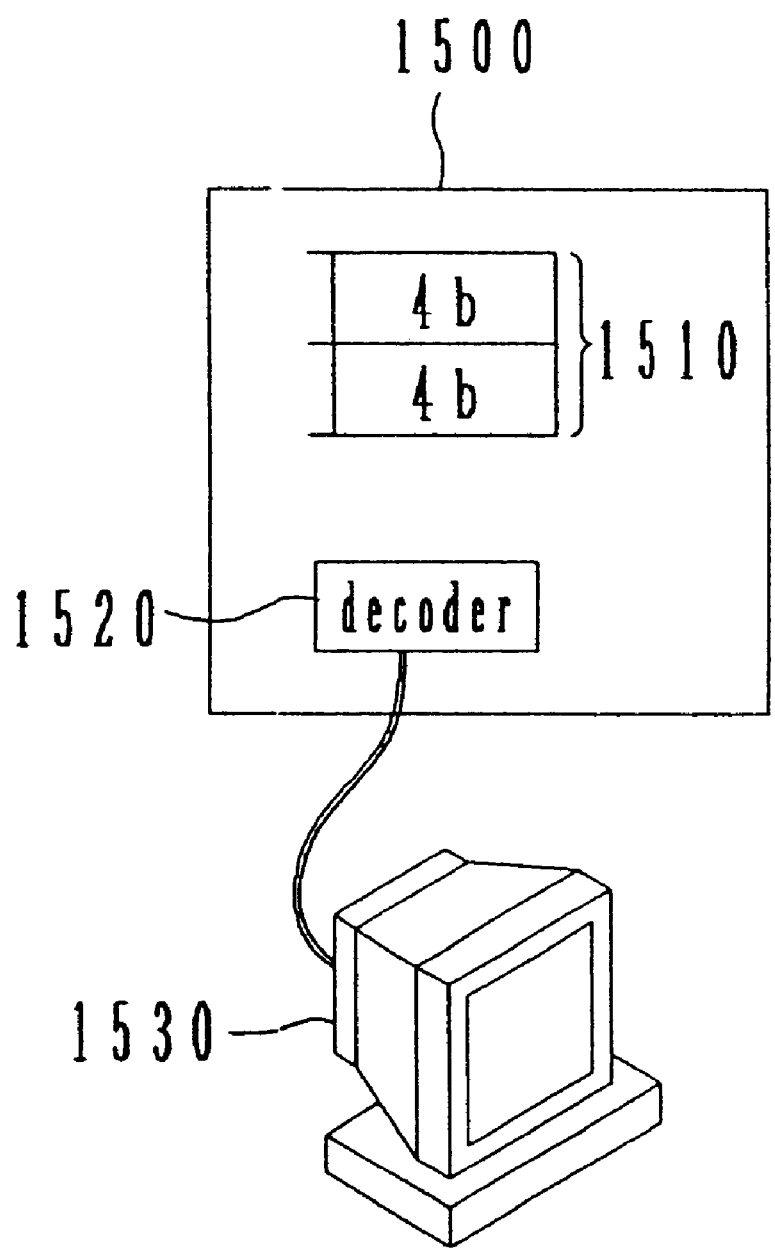
FIG. 16 is a conceptual diagram of a prior art terminal unit.
Figure 17:
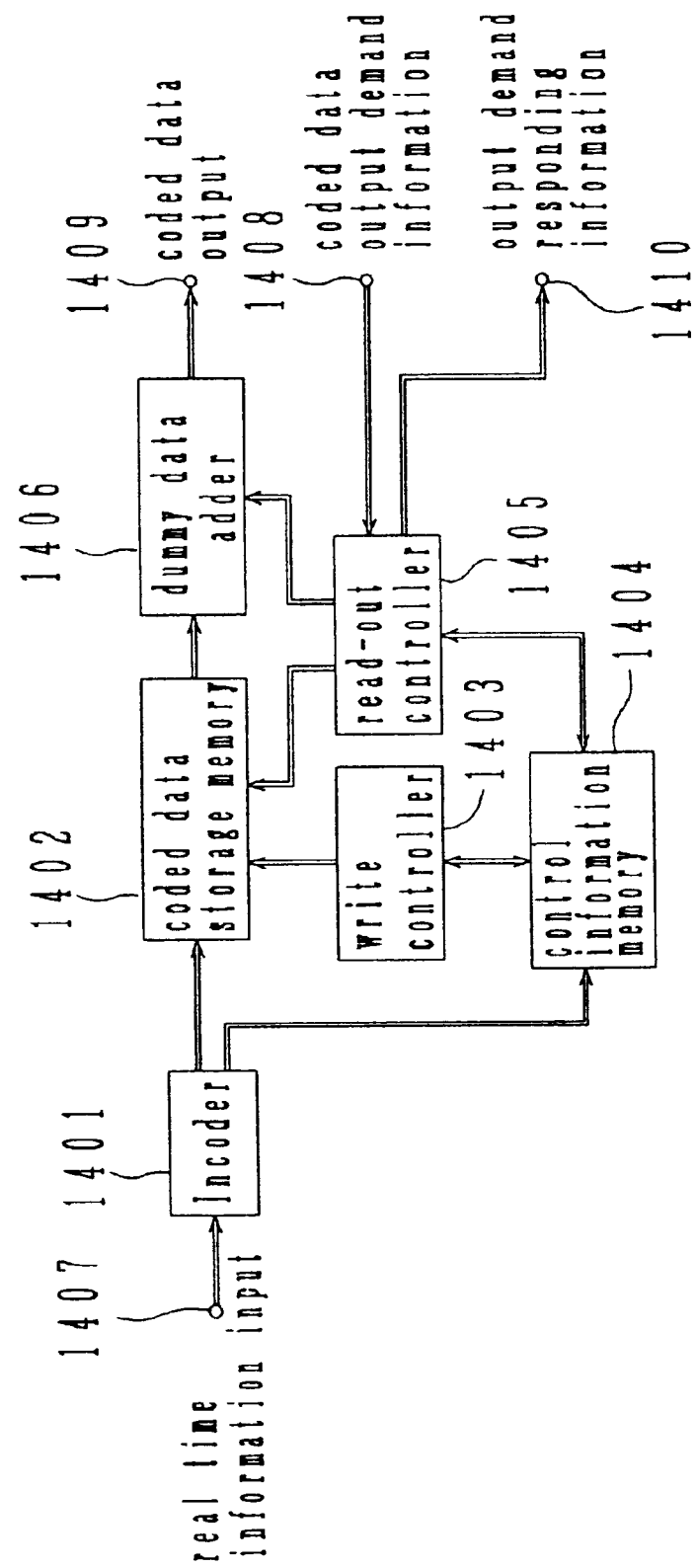
FIG. 17 is a block diagram a prior art data stream output apparatus.
Figure 18:
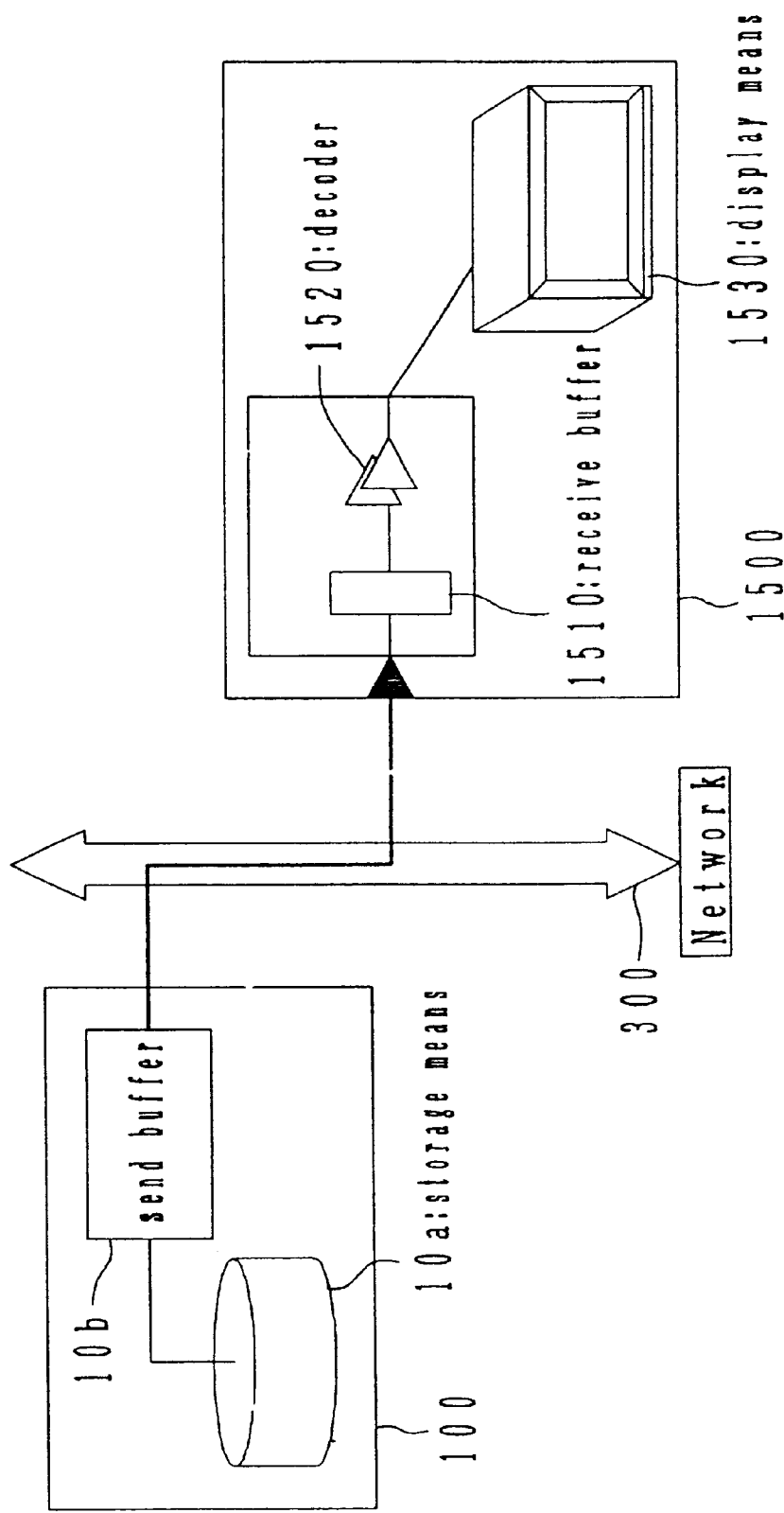
FIG. 18 is a block diagram showing the concept of the prior art server/terminal system
Figure 19:
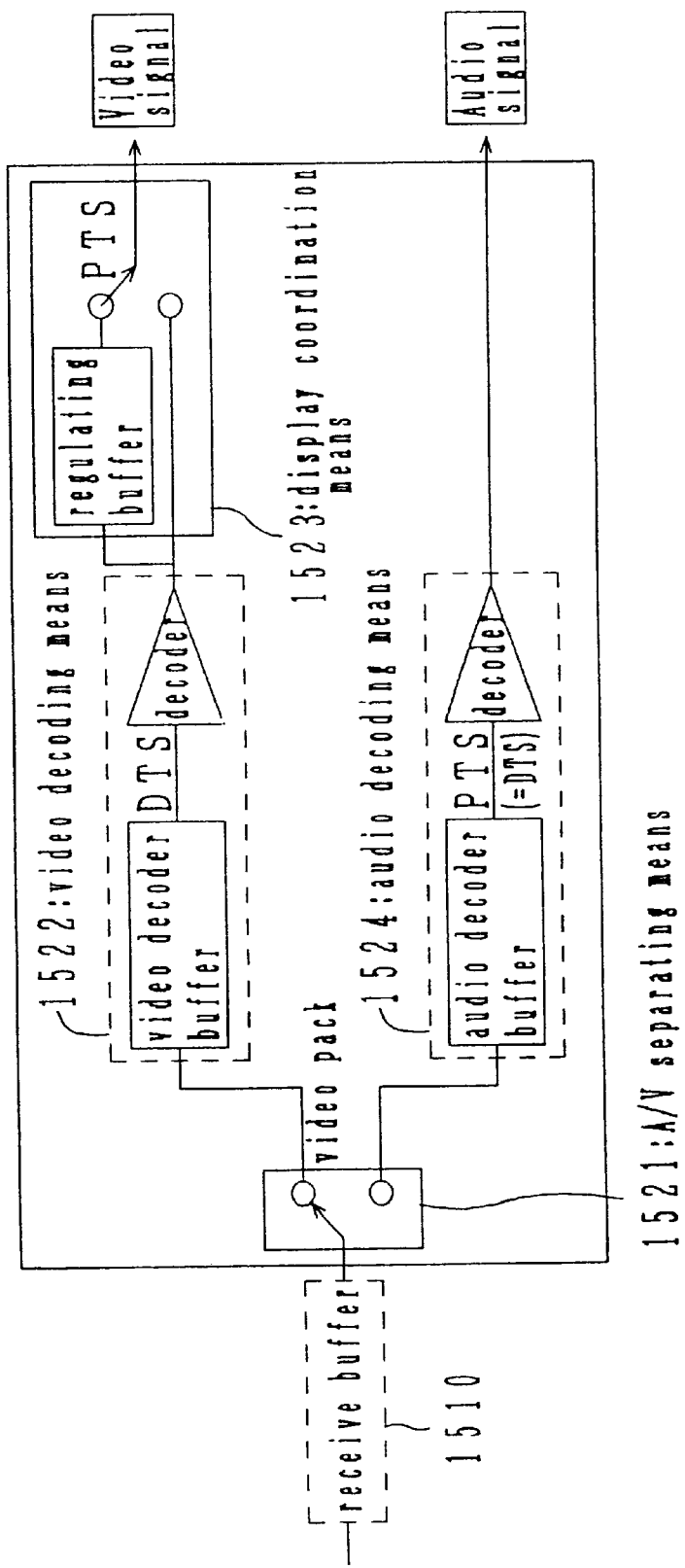
FIG. 19 is a block diagram showing the outline of the prior art terminal decoder.

In this connection, the data analysis has to proceed faster than the consumption of data in image reproduction if data is to be sent out real-time to the network The decoded data size $S_m$ of each GOP is added up from the top of the data by the offset address generating means 604 and the offset address $a_m$ from the top of the file of the GOP now being analyzed is generates (FIG. 14, Step S154).

The time code $t_m$, size Si of one GOP and offset address $a_m$ are referred to the duplication control means 120, which then copies into the data segment 106 in the send section X of the send buffer 110 the data size $S_m$ only out of the contents from the position of the offset address $a_m$ in the pre-reading buffer 103 (FIG. 14, Step S 152).

As described above, each send section X of the send buffer 110 is divided into the header segment 107 and the data segment 106 (size M). The effective data 108 thus copied occupies only the first segment of size $S_m$ in the data region 106. The remaining area (M−S$_m$) of the data region 106 is for padding 109.

In addition to the copying furthermore, the duplication control means 120 registers a value of size S$_m$ at a specific position in the header segment 107. That makes the GOP of time code t$_m$ ready for DMA transfer to an interface 111 (FIG. 14, Step S155). The same way, data which follow one GOP after another are stored in the send buffer 110 (FIG. 14, Step S156).

Data thus written in the send buffer 110 are divided in isochronous packets and sent out from the bus interface 111 to the terminal at the rate of (V+α)mbps. This process is already outlined in the description of Embodiment 3 with reference to FIG. 3, and will not be explained again here in the present embodiment.

The present embodiment has shown a case where IEEE 1394 is used as network interface. Needless to way, the same data stream output method will work well in the push-type transmission in Ethernet or ATM.

Also in the present embodiment, the size S$_m$ is taken as the whole data in one GOP. If the number of packs and time code are measured at frame time intervals using an MPEG decoder capable of analyzing data still faster, it is possible to control send with the GOP divided into a number of frames and time f allocated to each of the frames. It is noted in this connection that it is judged whether the system clock reference SCR at the top of a pack is within the grid interval (33.3667 msec). And on that basis, it is decided whether the pack should be included in the data size S$_m$. An end part of the pack may be outside the grid. That is, if mf≦SCR<(m+1)f, then the pack will be included in the data size S$_m$.

Embodiment 5

The sending of data GOP by GOP at a decoding time f—some 0.5 second—can now be controlled under the arrangements described in Embodiments 1 to 4. A further control is possible: the MPEG format image data in one GOP contains 15 frames of three kinds—I picture, B picture and P pictures, and adjustment of the send rate within one GOP is worth considering In sending out data on the network it is a usual practice to prepare data of a certain big size in the send buffer first and then split the big data into packets of a smaller size and send the data in such small packets.

Figure 7:
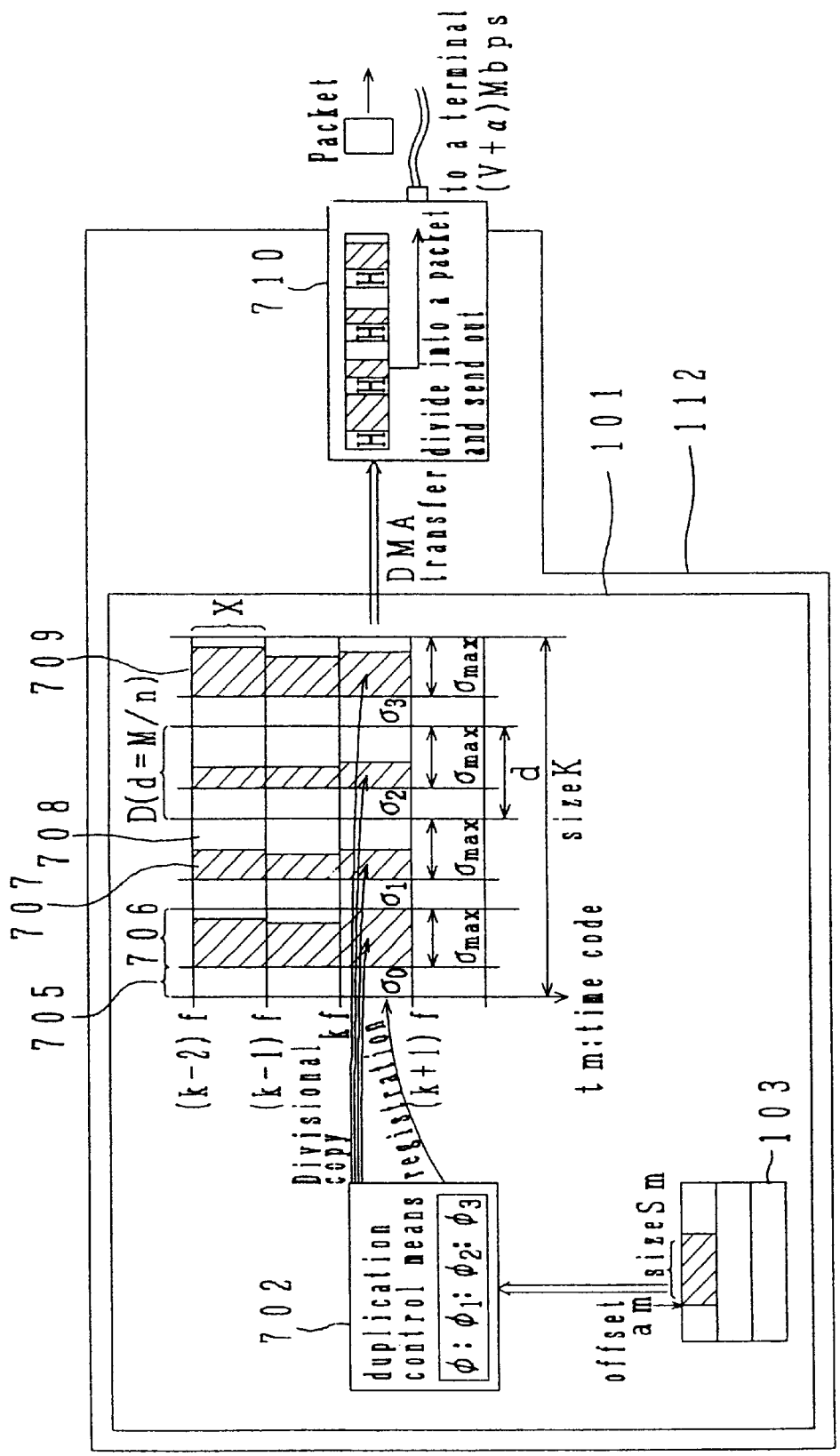
FIG. 7 is a block diagram of a server system in a fifth embodiment of the present invention

FIG. 7 is a data stream output apparatus with those points incorporated therein. Presupposing that data are further divided in a smaller size at the time of sending out as mentioned above, it is so configured that MPEG data are arranged within the send buffer with consideration given to the difference in data size among the aforesaid three kinds of pictures.

As stated in Embodiment 1 or 4, it should be understood that the data stream output apparatus 101 sends out encoded MPEG-format stream data in a quantity up to data size M per GOP. The pre-reading buffer 103 is configured as shown in FIG. 1. The send buffer 709 is also identical with the send buffer 110 except that the buffer 709 is provided with sub-sections D's. Now, the sending of GOP data of time code t$_k$(=kf) is considered. It should be assumed that the necessary data was read out on the pre-reading buffer 103a a time code t$_k$ before and is ready in the send step. The data size of the GOP is S$_k$ with a known offset address a$_k$ (see the description of the time search map Mt shown in FIG. 1 or the decoder 602 shown in FIG. 6)

In the video server system 112, when data is. handed over to a bus interface 710, it would be an efficient way to transfer the whole data—data stored in the send section X of size K—at a time to a buffer build in the bus interface 710 in the DMA transfer technique. But it is not always necessary to transfer at a time but the transfer may be effected in portions. As receiving data from the bus interface 710, the send buffer 710 splits the received data according to control chip specifications described below and refers the data to the control chip.

Figure 8:
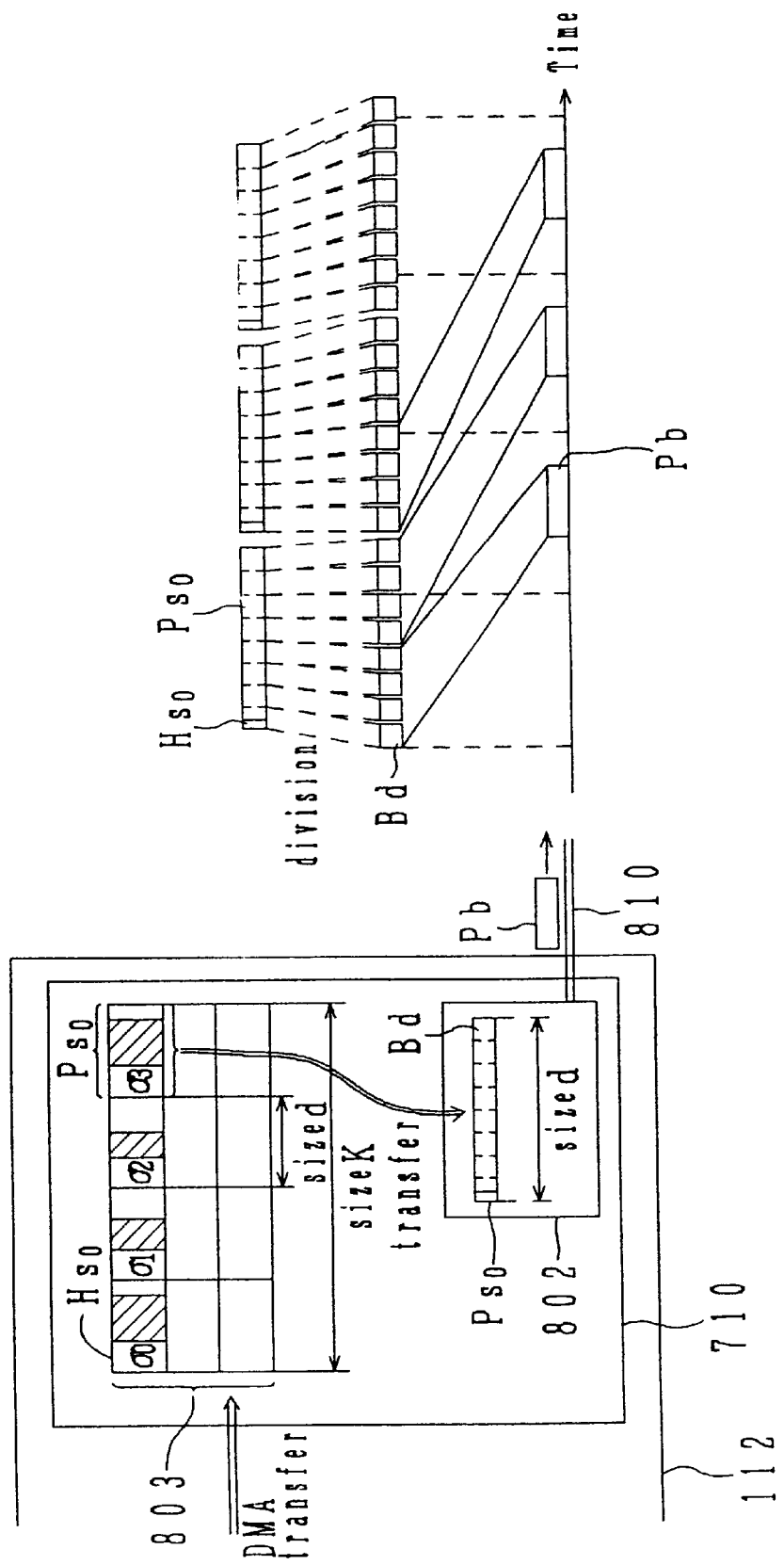
FIG. 8 is a model diagram of the server system in the fifth embodiment of the present invention

FIG. 8 is a conceptual diagram illustrating the arrangement of sending out packets to a network bus from the bus interface 710.

The operation of the bus interface as shown in FIG. 8 is known and will now be explained briefly.

The data in the send buffer 709 shown in FIG. 7 are stored with a header H$_{so}$ given per specific block size according to the network protocol. One data block shall be called source packet P$_{so}$.

The data within the send buffer 709 are transferred to the bus interface 710 by DMA transfer method. The source packet P$_{so}$ thus stored in an built-in buffer 803 of the bus interface 710 is split into a number of data blocks Bd's as set by control chip 802 on the network interface and turned into network packets Pb's with header information etc. imparted therein. The network packets Pb's thus generated are transmitted to the network bus 810.

The value thus determined is the maximum value σ$_{max}$ of data size that can be written in the sub-section D. The value is the maximum in the strict sense of the term It goes without saying that if the data size S$_m$ of the GOP decreases, the size σ$_{mi}$ (i: a suffix to indicate the position of a sub-section D within the send section X; and n≧i) will get small in proportion.

Since the data size S$_m$ at each time code t$_m$ is acquired from the time search map Mt or the decoder 602 as mentioned above, the duplication control means 702 in FIG. 7 works out the distribution of three pictures—I, B and P pictures—in the data size S$_m$, that is, the size σ$_{mi}$ to be allocated at the respective sub-sections D's on the pre-reading buffer 103 in a ratio φ (for example, φ=φ$_i$:φ$_2$:φ$_3$=: 4:2:1), and copies the results on the respective subsections D's. Each sub-section D is provided with a header segment 705 and a data segment 706. The real data 707 thus worked out is copied on the data segment 706 in the sub-section. The copying is done starting at the top of the sub-section D. The remaining part (σ$_{max}$−σ$_{mi}$) in the data segment 706 after the copying is for padding 708. The size σ$_{mi}$(σ$_{mo}$, σ$_{m1}$, . . . ; in FIG. 7, m is not represented) of read data written in the data segments 706 of the respective sub-section D are registered at the respective header segments 701.

Needless to say, the duplication control means 702 has a function of rounding off the size of data and adjusting the boundary.

A GOP of data with time code t$_k$=k$_f$ is now ready for DMA transfer to the bus interface 710. Likewise, GOP data at t$_{k+1}$=(k+1) f and after that are registered in the send buffer 709. That way, it is possible to effect network transfer, allowing for the difference in the rate of data transfer in MPEG frames.

Figure 9:
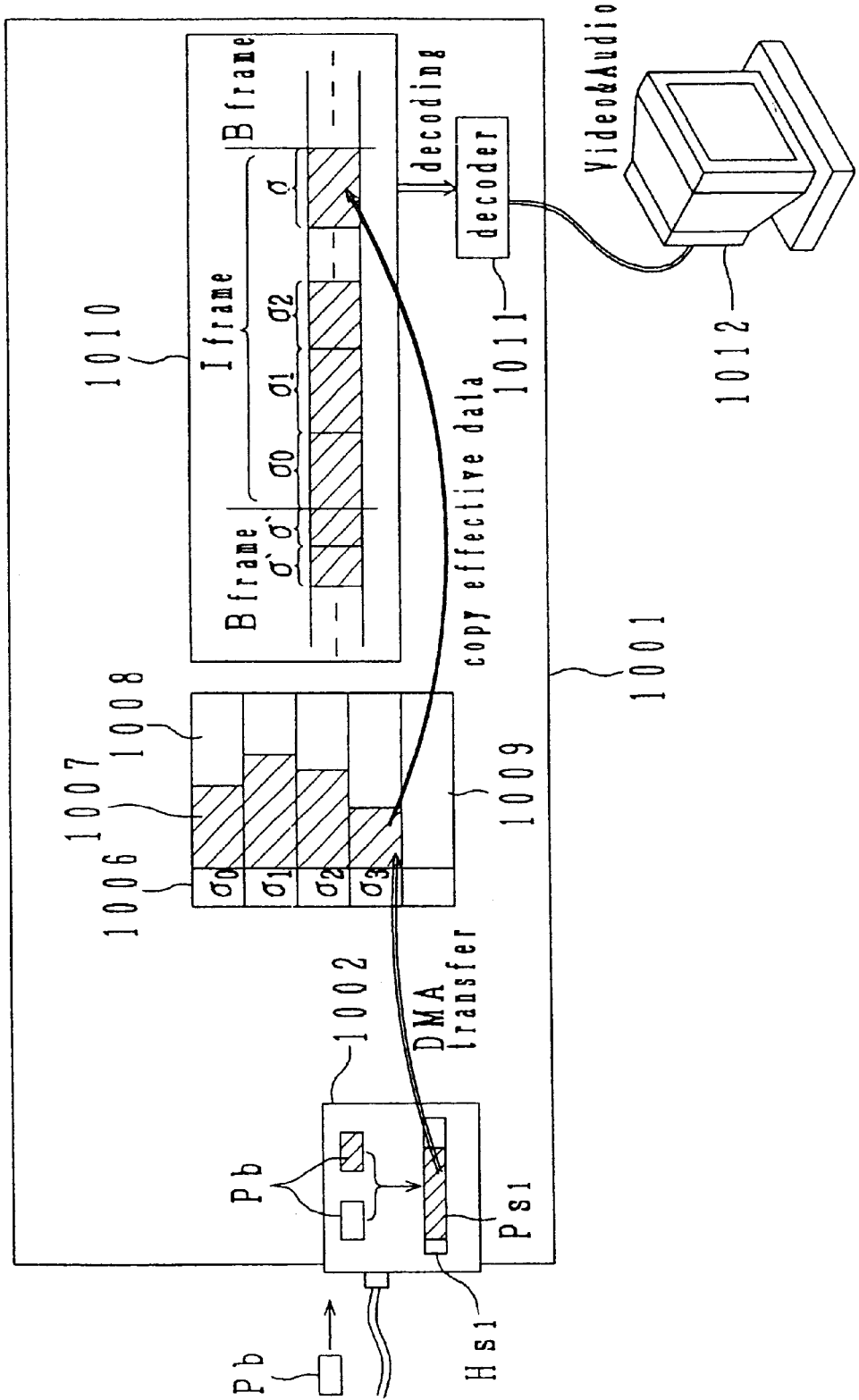
FIG. 9 is a block diagram of a terminal system to be connected to the server system in the fifth embodiment of the present invention.

The terminal system for that arrangement is configured as in FIG. 9, for example. In FIG. 9, a bus packet Pb received by a bus interface 1002 in a terminal system 1001 is built up into a source packet Ps$_1$ with a header Hs$_1$ corresponding to the source packet Ps$_o$ on the server side shown in FIG. 8. Then, the bus interface 1002 transfers the source packet Ps1 to a receive buffer 1009 by DMA transfer method.

The source packet Ps$_1$ in that state is made up of a header Hs$_1$, an effective data 1007 and a padding 1008. The size σ of the effective data on the source packet $Ps_1$ is then picked out from a header $Hs_1$ stored in a header part 1006 of the receive buffer 1009, and the effective data alone is copied on an MPEG data buffer 1010. The MPEG data built at the MPEG data buffer 1010 is sent to an MPEG decoder 1011 for reproduction and displayed on a monitor 1012.

An example of isochronous packets equally split in a size in the IEEE 1394 bus is described in the present embodiment. Where the split size is different from packet to packet as the IP packet on Ethernet, too, it goes without saying that the present invention will also work well through adjustment of the distribution ratio at the duplication control means 702, though there is more or less increase in error.

Embodiment 6

In Embodiment 5, the data size ratio among I picture, P picture and Picture B is fixed. It can happen that changes in ratio with time as in variable-length encoding can not be coped with.

Figure 10:
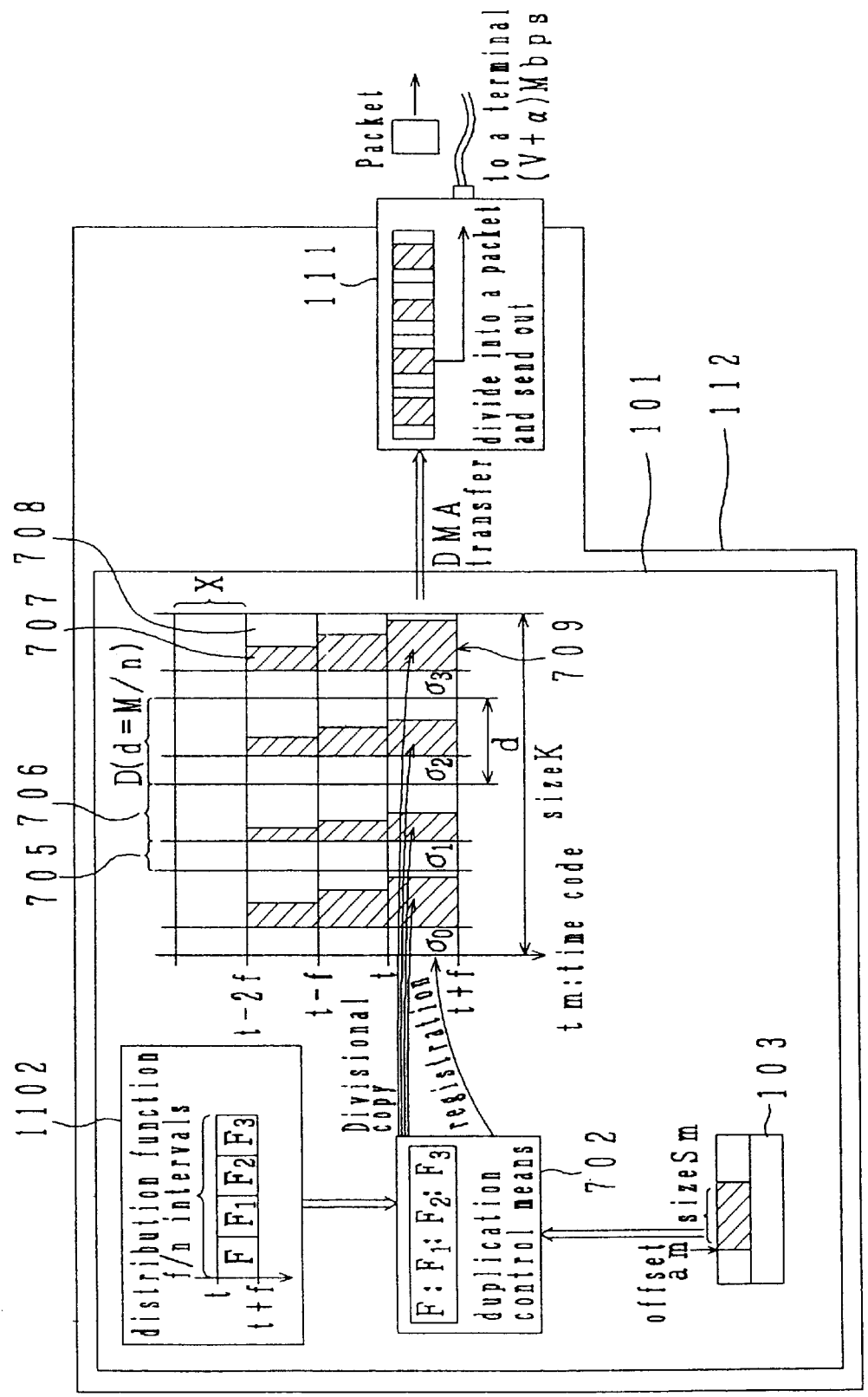
FIG. 10 is a block diagram of a server system in sixth, seventh and eighth embodiment of the present invention.

FIG. 10 shows the concept of a video server to solve such a problem

In FIG. 10, a distribution function reference means 1102 conveys to the duplication control means 702 a time-wise distribution of data size of I, B and P pictures in a time resolution for f/n Then, the duplication control means 702 can work out an exact size $\sigma_{mi}$ of an effective data to be written in the sub-section D on the send buffer 70 every f/n on the basis of information from the distribution function reference means 1102. But the integer n does not always denote the number of frames in one GOP, and it is more fitting technically in network implementation to consider the integer n as number of source packets $Ps_o$ split from the send buffer 709 according to the network protocol. Needless to say, the duplication control means 702 has a function of rounding off the size of data and adjusting the boundary in calculating real data size $\sigma_{mi}$.

On the other hand, it is necessary to have information generated and ready for the distribution function reference means 1102 to refer to. As the information generating means, the MPEG encode engine 404 can serve the purpose well if it is so configured as to acquire the size of data for every f/n. Alternately, it is conceivable to use an MPEG decode mean 503 shown in FIG. 5 that can measure the size of data per f/n. That is, a time search map Mt on the basis of not f but f/n will do.

Embodiment 7

Figure 11:
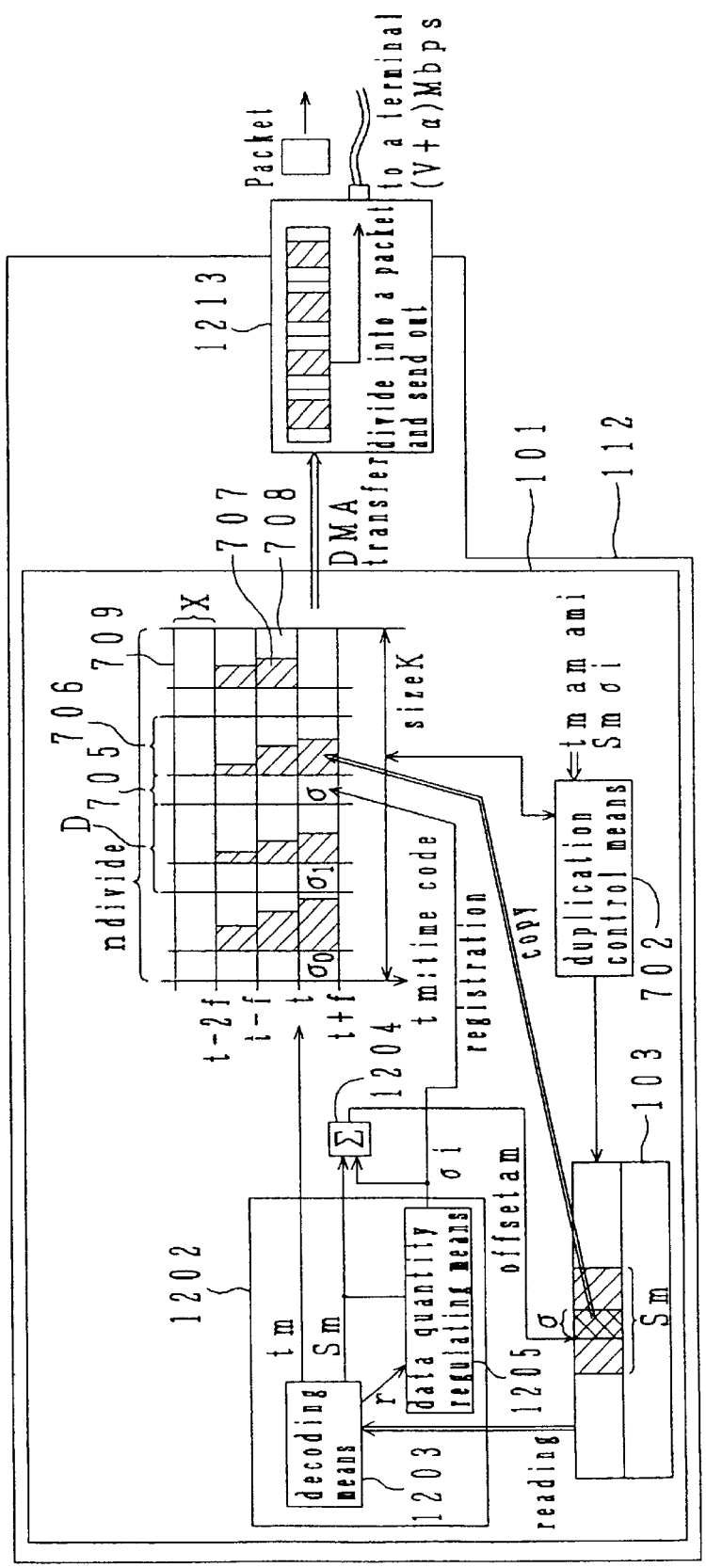
FIG. 11 is a block diagram of a server system in a ninth embodiment of the present invention.

Another example is shown in FIG. 11 that can cope with changes in data size among I picture, P picture and B picture as in Embodiment 6.

In FIG. 11, it should be understood that encoded MPEG stream data are to be sent out in a data size of up to the maximum M per GOP as in the preceding embodiments. There will now be considered an example of sending GOP for time code $t_k(=kf)$. It should be assumed that necessary data read out on the pre-reading buffer 103 a time code tk is now ready for the send step.

As MPEG encoded data is supplied to the pre-reading buffer 103, the data is led to an MPEG decoder 1202 for analysis. To send out data real-time to the network the data analysis rate has to be higher than that of data consumption in image reproduction.

If it is judged from data contained in a video pack that the pack contains the forefront data of one GOP, the MPEG decoding means 1203 starts and continues to count packs until the forefront pack in the next GOP comes, then works out the data size of one GOP. The means 1203 also picks out time code tk from the pack header of the forefront pack in the GOP, too. Furthermore, the MPEG decoding means 1203 has a function of calculating the size r of data consumed for image reproduction in a time resolution with the time f split into n equal parts. As described in Embodiment 6, the number n may be the number of frames in a GOP, but rather it is better that it should be considered an integer determined by conditions related to the sending out of data to the network (a number corresponding to the number of source packets into which a GOP of data is split.

The data size $S_m$ for time code $t_m$ is added up from the top of the file by an offset address generating means 1204, and the offset address $a_k$ of the GOP for time code $t_k$ is generated from the top of the file. The means 1204 also calculates the offset address $a_{ki}$ (i: n≧I)

In this case, too, the send section X on the send buffer 709 is split in n equal parts as mentioned above and each sub-section is an area to store data for a time code of f/n.

As described above, the duplication control means 702 copies data from the pre-reading buffer 103 into the send buffer 709 on the basis of the data size r for split parts acquired from the MPEG decoding means 1203. In other words, a data size regulating means 1205 rounds off the aforesaid data size r or makes boundary adjustment, calculating the data size $\sigma_{ki}$ to be copied. By the way, this calculation of the data size $\sigma_{ki}$ requires the value of the total size $S_m$ of data in one GOP. The data size $\sigma_{ki}$ is thus calculated and added up one after another for the offset address generating means 1204 to find an offset address $a_{ki}$ for the data to be written in the sub-section Then, the data size a $\sigma_{ki}$ from the pre-reading buffer 103 is copied on the data segment 706 in the sub-section D for the corresponding time code. At the same time, the value of the data size $\sigma_{ki}$ is registered on the header region 705.

As the aforesaid step fills out the send section X on the send buffer 709, the data will be sent out to the network device by DMA transfer method, followed by writing data on the next send section X (m=k+1).

Incidentally, the term "time code" as used herein denotes a time base for processing a certain size of data and corresponds to system clock reference in MPEG as mentioned earlier.

If the above decoder 502 and 602 can acquire the data size "S" and the offset address "a" per time unit "f" because the decoding which is necessary for the reproduction is not performed here, it is sufficient. If the reference mark "$a_m$" should be a value representing the position of the data portion in the steam data which is now being processed, $a_m$ is not limited to be an offset address. And if the term "file" should be a concept denoting a block of moving picture data, the "file" can be replaced with other name. Although only explanation on GOP of MPEG was provided here, a,data block of a given data size (Sm) may be employed in lieu of said GOP.

What is claimed is:

1. A data stream output apparatus for reading data stream from a storage medium to an external device via a digital interface, the data stream including motion picture data encoded at variable bit rates, the apparatus comprising:
    a read buffer for storing the data stream read from the storage medium;
    a memory for storing a time table indicating the position and size (Sm) of the data block to be sent out to the external device every given period (f) in the data stream, the data block including motion picture data to be decoded by the external device every given period (f);

a send buffer for storing the data stream to be sent out to the external device via the digital interface; and a controller controlling the outputting of the data stream stored by the read buffer from the send buffer to the external device via digital interface, wherein said controller decides the data block to be sent out for the given period (f) of data stream stored by the read buffer according to the time table, transmits the decided data block from the read buffer to the send buffer, adds padding data to the transmit data block so as to have a fixed size (K) when the size (Sm) of transmit data block is not equal to the fixed size (K), controls the outputting of the resultant data block from the send buffer to the external device via the digital interface.

2. The data stream output apparatus as defined in claim 1, wherein the fixed size (K) is equal to the maximum permissible size (M) of the portion to be decoded every given period (f) in said data stream.

3. The data stream output apparatus as defined in claim 1, wherein said time table indicates the position of said data block to be decoded in said data stream in terms of an offset value counting from the head of said data stream.

4. The data stream output apparatus as defined in claim 1, wherein data are transmitted to a system provided with a decoder for said data stream via the digital interface.

5. The data stream output apparatus as defined in claim 1, further comprising;

a storage means for storing data stream inputted from outside on said storage medium;

an encoding means for encoding data inputted from outside into data stream at variable bit rates; and a time table generating means for calculating the size of data required for decoding every given period(f) according to an encode parameter and generating said time table on encoded data stream.

6. The data stream output apparatus as defined in claim 1, further comprising;

a storage means for storing data stream inputting from outside of said storage medium; and, a time table generating means which, if the data block inputted from outside is encoded stream data, will calculate the size of data required for decoding every given period (f) according to an encode parameter and generate said time table on encoded data stream.

7. A data stream output apparatus for reading data stream from a storage medium to an external device via digital interface, the data stream including motion picture data encoded at variable bit rates, the apparatus comprising:

a read buffer for storing the data stream read from the storage medium;

a send buffer for storing the data stream to be sent out to the digital interface; and a controller controlling the outputting of the data stream stored by the read buffer from the send buffer to the outside device via digital interface, wherein the controller calculates the position and size (Sm) of the portion to be decoded every given period (f) in the data stream, decides the data block to be sent out for the given period (f) of data stream stored by the read buffer on the basis of said calculated position and data size (Sm), adds padding data to the transmit data block so as to have a fixed size (K) when the size (Sm) of transmit data block is not equal to the fixed size (K), controls the outputting of the resultant data unit from the send buffer to the external device via the digital interface.

* * * * *

UNITED STATES PATENT AND TRADEMARK OFFICE
CERTIFICATE OF CORRECTION

PATENT NO. : 6,460,097 B1
DATED : October 1, 2002
INVENTOR(S) : Hideaki Harumoto et al.

It is certified that error appears in the above-identified patent and that said Letters Patent is hereby corrected as shown below:

<u>Title page,</u>
Item [30], appears as:

-- [30] Foreign Application Priority Data
June 9, 1998  JP ............................H10-160583 --

Item [56], References Cited, U.S. PATENT DOCUMENTS, after "3/2001" replace "WataAndonabe" with -- Watanabe --

Signed and Sealed this

Eighth Day of April, 2003

JAMES E. ROGAN
*Director of the United States Patent and Trademark Office*